(12) United States Patent
Pooler et al.

(10) Patent No.: US 6,945,925 B2
(45) Date of Patent: Sep. 20, 2005

(54) BIOSEQUESTRATION AND ORGANIC ASSIMILATION OF GREENHOUSE GASES

(76) Inventors: Joel Pooler, 9 Western Ave., Augusta, ME (US) 04330; Christopher L. Pooler, 9 Western Ave., Augusta, ME (US) 04330

( * ) Notice: Subject to any disclaimer, the term of this patent is extended or adjusted under 35 U.S.C. 154(b) by 0 days.

(21) Appl. No.: 10/848,204

(22) Filed: May 18, 2004

(65) Prior Publication Data

US 2005/0027155 A1 Feb. 3, 2005

Related U.S. Application Data

(60) Provisional application No. 60/491,812, filed on Jul. 31, 2003.

(51) Int. Cl.[7] .................................................. B09B 1/00
(52) U.S. Cl. .................... 588/250; 405/129.1; 405/303; 47/58.1 R
(58) Field of Search ....................... 588/250; 405/129.1, 405/303; 47/58.1 R

(56) References Cited

U.S. PATENT DOCUMENTS

| | | |
|---|---|---|
| 4,423,019 A | 12/1983 | Bertolacini et al. |
| 4,609,539 A | 9/1986 | Horecky et al. |
| 4,617,175 A | 10/1986 | Tolpin et al. |
| 4,622,210 A | 11/1986 | Hirschberg et al. |
| 5,269,929 A | 12/1993 | Sublette et al. |
| 5,501,718 A | 3/1996 | Bandurski |
| 5,605,635 A | 2/1997 | David |
| 6,100,382 A | 8/2000 | Wolfe et al. |
| 6,287,873 B2 | 9/2001 | Srivastava et al. |
| 6,399,030 B1 | 6/2002 | Nolan |
| 6,447,437 B1 * | 9/2002 | Lee et al. ................. 588/250 |
| 6,517,288 B2 | 2/2003 | Schindler |

FOREIGN PATENT DOCUMENTS

| | | |
|---|---|---|
| EP | 1 260 282 A2 | 11/2002 |
| JP | 62289222 A | 12/1987 |
| JP | 8015105 A2 | 1/1996 |
| JP | 11347333 A2 | 12/1999 |
| JP | 2000018611 A2 | 1/2000 |
| WO | WO 94/12444 | 6/1994 |

OTHER PUBLICATIONS

Hoosbeek, et al.: "Bog Ecosystem Research Initiative—objectives, hypothesis, and research methods" Publications of the Academy of Finland Jan. 1996: 300–305.*

Marcel R. Hoosbeek et al., Boc Ecosystem Research Initiative–objectives, hypotheses and methods to investigate the influences of elevated CO2 and Nitrigen on Spahnum, wesbsite http://www.joensuu.fi/mekri/beri/abstract.htm.

* cited by examiner

*Primary Examiner*—John Kreck
(74) *Attorney, Agent, or Firm*—Pierce Atwood; Kevin M. Farrell

(57) ABSTRACT

Provided herein are methods for the biosequestration and organic assimilation of a gas that contributes to the greenhouse effect. In these methods, a gas that contributes to the greenhouse effect is introduced into a peat bog where it is thereafter sequestered and organically assimilated. A capture method may be employed in conjunction with the present invention to enable transport of the gas from an industrial site to a processing facility located at or near a peat bog. Once transported to a relevant processing facility, the captured gas may be regenerated and thereafter introduced into the peat bog for its biosequestration and organic assimilation. In the context of the present invention, the gas may be a greenhouse gas (GHG), sulfur oxide ($SO_x$) gas, and/or volatile organic compound (VOC).

19 Claims, 5 Drawing Sheets

Regeneration of Captured Greenhouse Gases

BIOSEQUESTRATION AND ORGANIC ASSIMILATION OF GREENHOUSE GASES

RELATED APPLICATIONS

This application claims benefit of U.S. Provisional Application No. 60/491,812, filed Jul. 31, 2003.

BACKGROUND OF THE INVENTION

In an environment absent from human influence, there has been a balance between the earth and atmospheric greenhouse gases. Since the industrial age, human based activity has resulted in what is known as the greenhouse effect. Contributors to the greenhouse effect are:

Methane

Carbon oxides
   carbon monoxide CO and carbon dioxide $CO_2$

Nitrous oxides ($NO_x$)
   unreactive gaseous nitrogen, $N_2$
   reactive $NO_3^-$, $NO_2^-$, NO, $N_2O$ and $NO_x$ Sulphur oxides ($SO_x$)
   mainly $SO_2$ and $SO_3$ Volatile Organic Compounds (VOCs)

Particulate Matter (PM)

Carbon-Halogen Compounds

Sulfur halogen compounds

Carbon dioxides are the most common greenhouse gas. "Methane is twenty-one times as potent as carbon dioxide according to the US Environmental Protection Agency" (Segelken, Roger. "Cornell biologists aim to grow 'bugs' responsible for greenhouse gas, methane, in NSF-funded microbial observatory." *Cornell News* 8 Feb. 2002). "$N_2O$ is a greenhouse gas that is two hundred times more effective per molecule than is $CO_2$ in absorbing infrared radiation. "$N_2O$ is a potent greenhouse gas with an estimated 5% contribution to global warming, owing to its long residence time in the atmosphere (150 years) and its relatively high infrared absorbance (>200 times that of carbon dioxide)" (Apel, William A., Turick, Charles E. "The use of denitrifying bacteria for the removal of nitrogen oxides from combustion gases." *Fuel*, Vol. 72, Issue 12, pg. 1715–1718, 1993). In addition, $N_2O$ in the stratosphere reacts with excited oxygen in the presence of ultraviolet radiation to produce NO, which catalyzes the destruction of stratospheric ozone ($O_3$). Given that the atmosphere is already 78% $N_2$, $N_2$ emissions to the atmosphere via denitrification have no significant atmospheric effects, although these losses may influence ecosystem nitrogen pools. Atmospheric $N_2$ has a turn over time of thousands of years" ("Chapter 8. Terrestrial Nutrient Cycling." Principles of Terrestrial Ecosystem Ecology Chapin III, F. Stuart, Matson, Pamela, Mooney, Harold A. 1st ed. 2002 Corr. 2nd printing, 2004, XIV, 436 p. 199 illus.). Ultraviolet rays enter the earth's atmosphere and are normally deflected back through the ozone layer. The $NO_x$ emissions react in the ozone layer trapping ultraviolet radiation leading to global warming known as the greenhouse effect.

SUMMARY OF THE INVENTION

The present invention relates to methods for the biosequestration and organic assimilation of a gas that contributes to the greenhouse effect. These methods comprise introducing a gas that contributes to the greenhouse effect into a peat bog where it is thereafter sequestered and organically assimilated. The methods may further comprise capturing the greenhouse gas using a capture means which enables transport of the captured gas and regeneration of the gas; transporting the captured gas to a processing facility located at or near the peat bog; and finally regenerating the gas prior to its introduction into the peat bog.

In the context of the present invention, a gas that contributes to the greenhouse effect may be selected from the group consisting of greenhouse gases (GHGs), sulfur oxide ($SO_x$) gases, and volatile organic compounds (VOCs). A greenhouse gas may further be selected from the group consisting of methane ($CH_4$), carbon oxides, nitrogen oxides ($NO_x$), carbon-halogen containing gases, and sulfur-halogen containing gases. A carbon oxide may be selected from the group consisting of carbon monoxide (CO) and carbon dioxide ($CO_2$). A nitrogen oxide may be selected from the group consisting of $NO_3^-$, $NO_2^-$, NO, $N_2O$, $N_2O_2$, $N_2O_3$, $N_2O_4$, and $N_2O_5$. A carbon-halogen containing gas may be selected from the group consisting of hydrofluorocarbons (HFCs), chlorofluorocarbons (CFCs), and perfluorocarbons (PFCs). A perfluorocarbon (PFC) may be selected from the group consisting of $CF_4$ and $C_2F_6$. A carbon-halogen containing gas may be selected from the group consisting of methyl bromide ($CH_3Br$) and carbon tetrachloride ($CCl_4$). A sulfur-halogen containing gases may comprise sulfurhexofluoride ($SF_6$).

Wherein the greenhouse effect is acid rain, the methods of the present invention may be used to biosequester and organically assimilate sulfur dioxide ($SO_2$), sulfur trioxide ($SO_3$), and/or sulfate ($SO_4^{-2}$). Additionally, the methods of the present invention may be used to biosequester and organically assimilate non-methane hydrocarbons, alcohols, aldehydes and/or organic acids.

Capture of a gas at an industrial site may be characterized by the ability to absorb, associate, crack, chelate, strip, dissociate, dissolve, entrap, modify, precipitate, and/or purify the greenhouse gas. Capture may be achieved with a water, amine, alkaline, and/or alkanolamine solution. The alkanolamine solution may comprise monoethanolamine (MEA), diethanolamine (DEA), triethanolamine, methyldiethanolamine (MDEA), and/or 2-amino-2-methyl-1-propanolamine (AMP), and/or aqueous blends thereof.

Once captured, the gas may be regenerated via processes such as thermal desorption of the capture solution. Once regenerated, the gas may be introduced into the peat bog via processes such as unidirectional injection in gaseous or liquid phase into the recesses of peat.

DETAILED DESCRIPTION OF THE INVENTION

Figure 1:
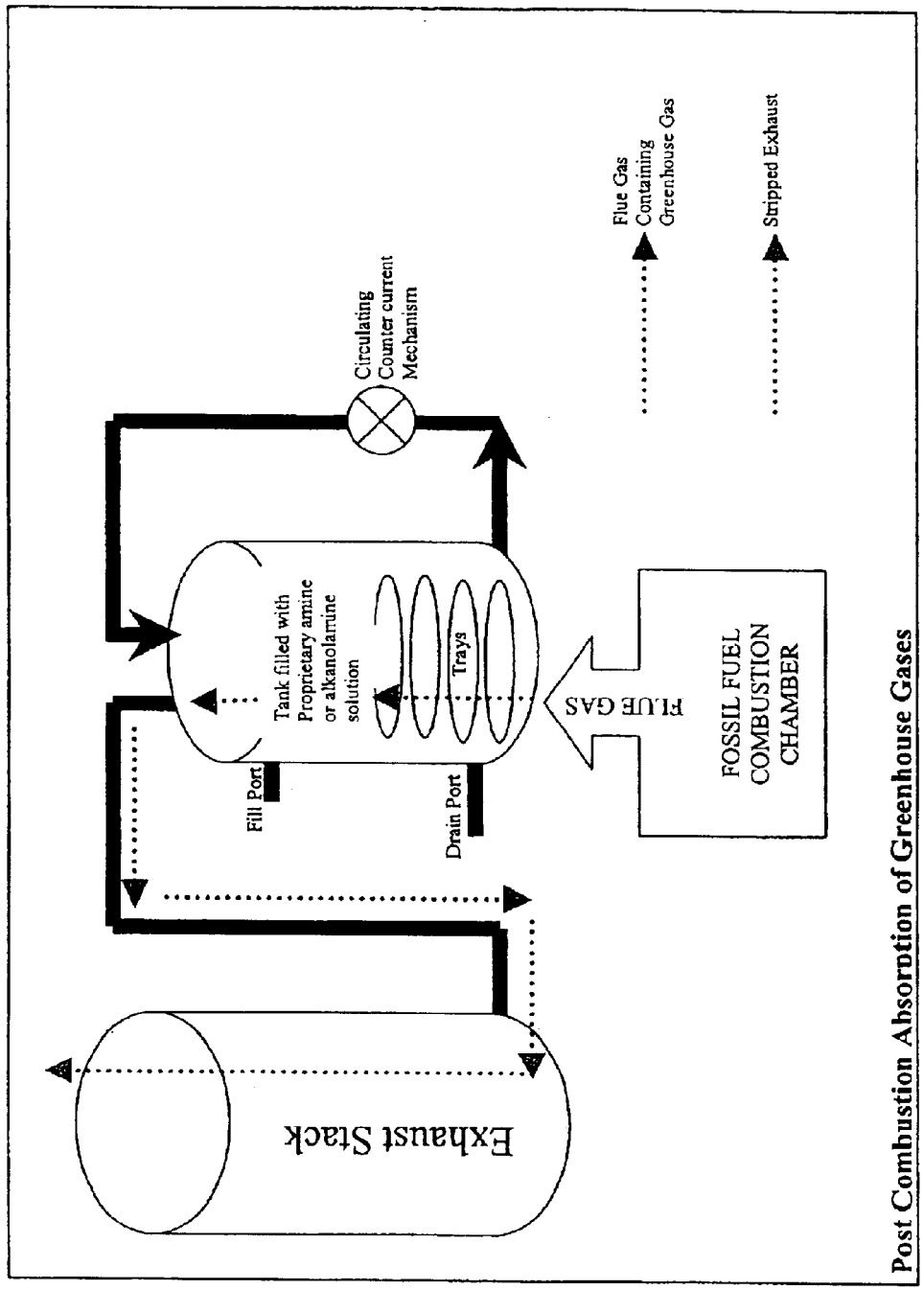
FIG. 1 illustrates a simplified example of greenhouse gas capture.
Figure 2:
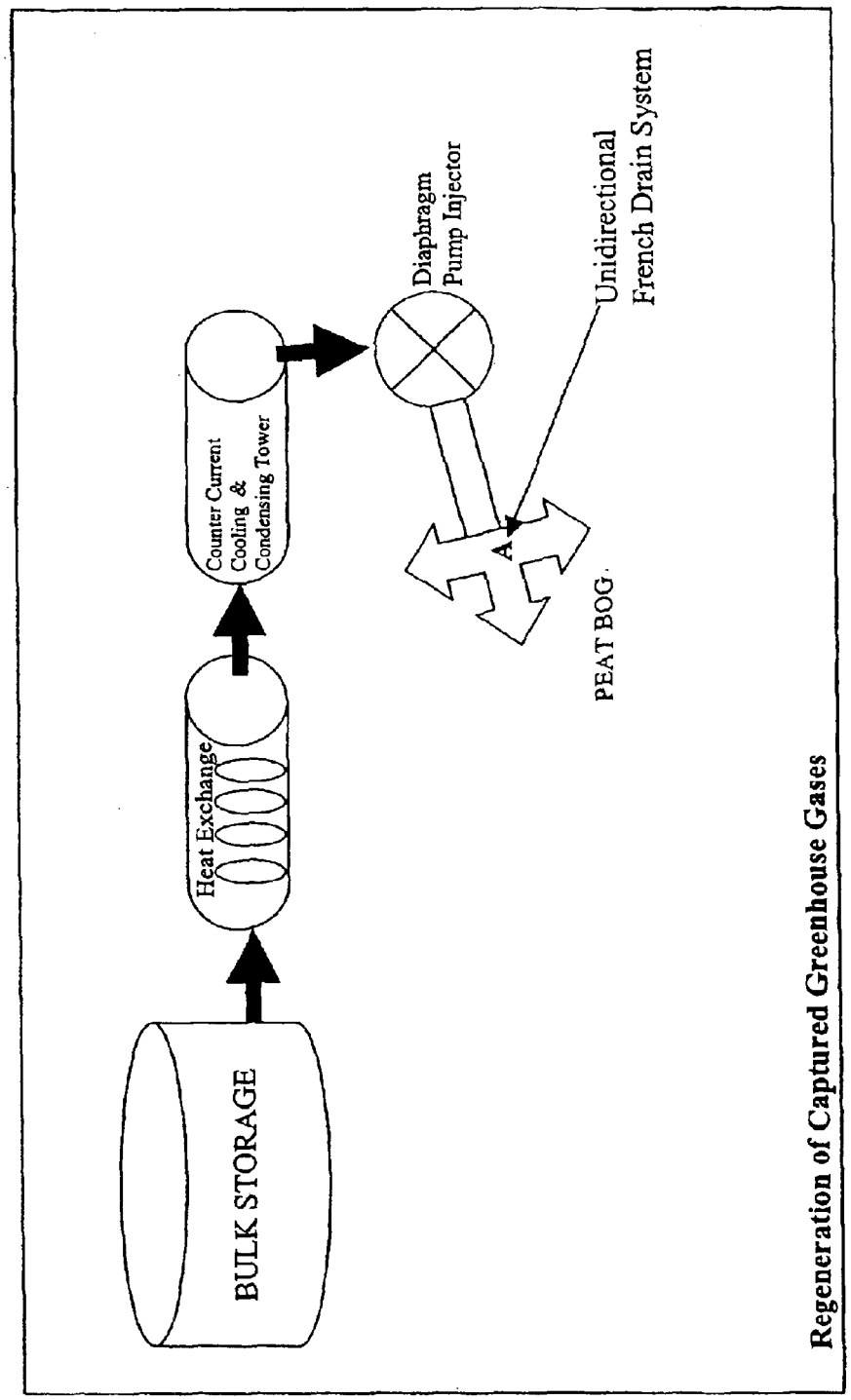
FIG. 2 shows a simplified example of greenhouse gas regeneration.
Figure 3:
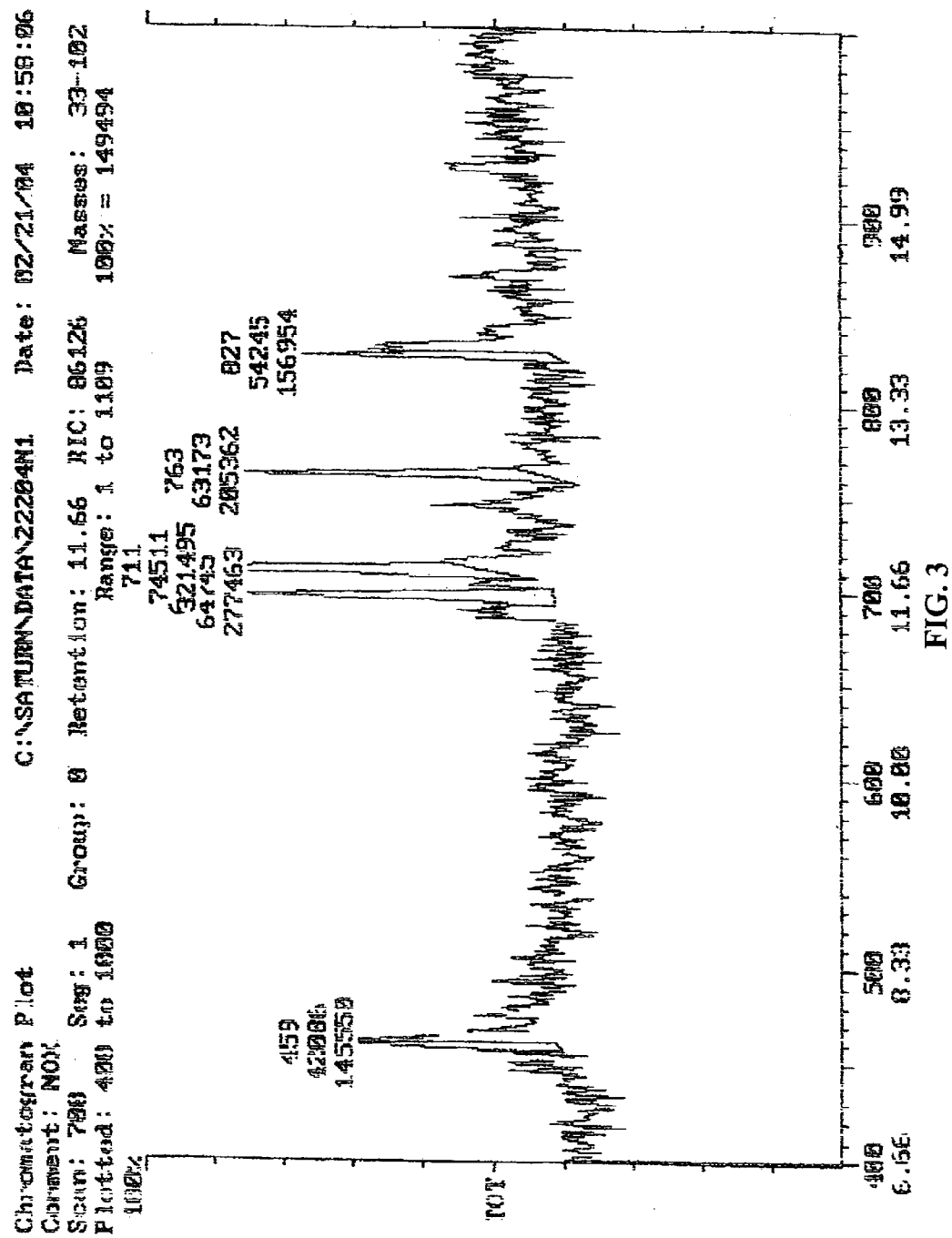
FIG. 3 illustrates a chromatogram of a $NO_x$ gas mixture containing $N_2O_2$, $N_2O_3$, $NO_2$, $N_2O_4$, and $N_2O_5$. The chromatogram contains five peaks wherein each peak is attributed to each of the five gases.
Figure 4:
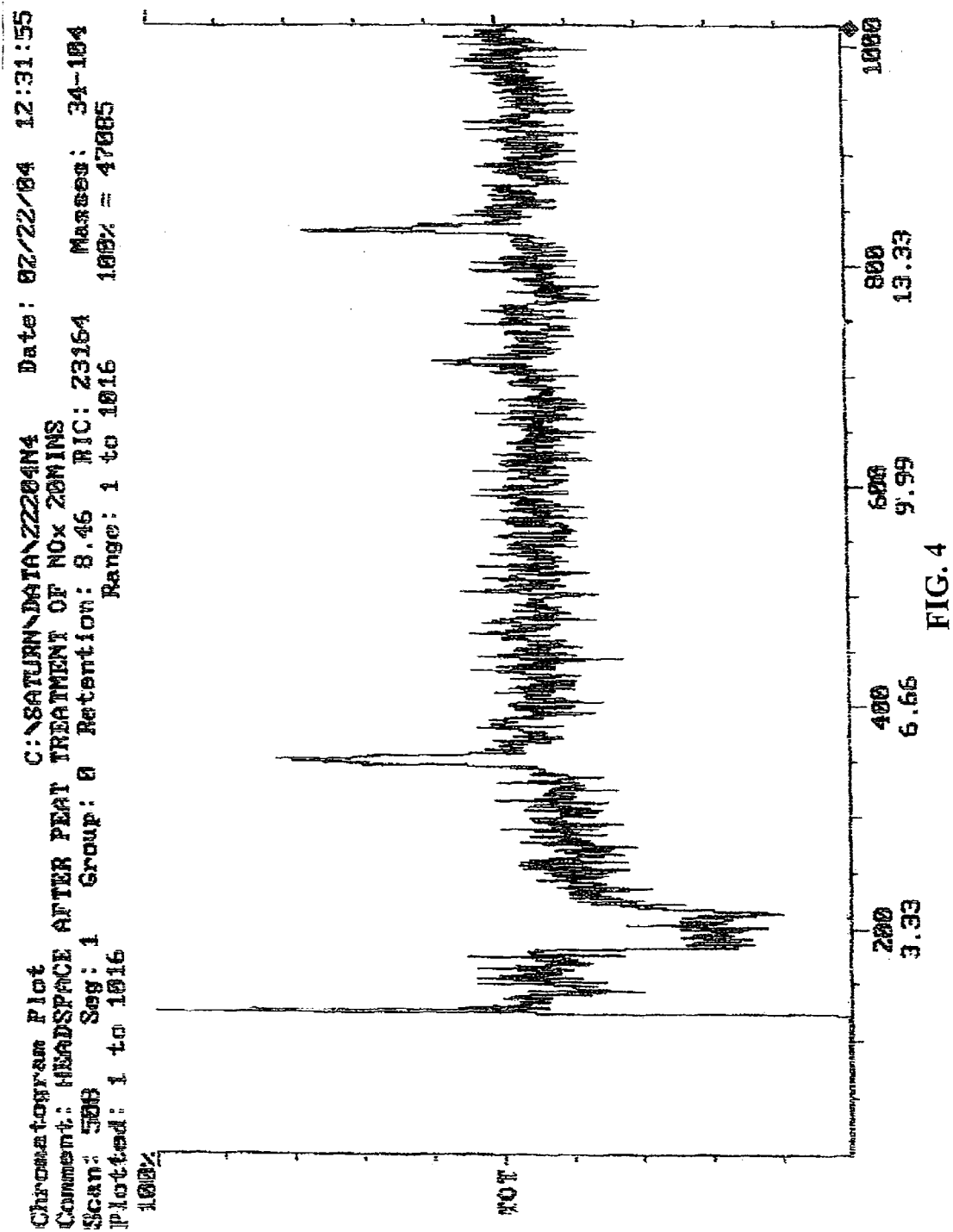
FIG. 4 illustrates a chromatogram of the headspace following a 20 minute treatment of the $NO_x$ gases with peat. Peaks corresponding to four of the five $NO_x$ gases are absent from the mixture following peat treatment.
Figure 5:
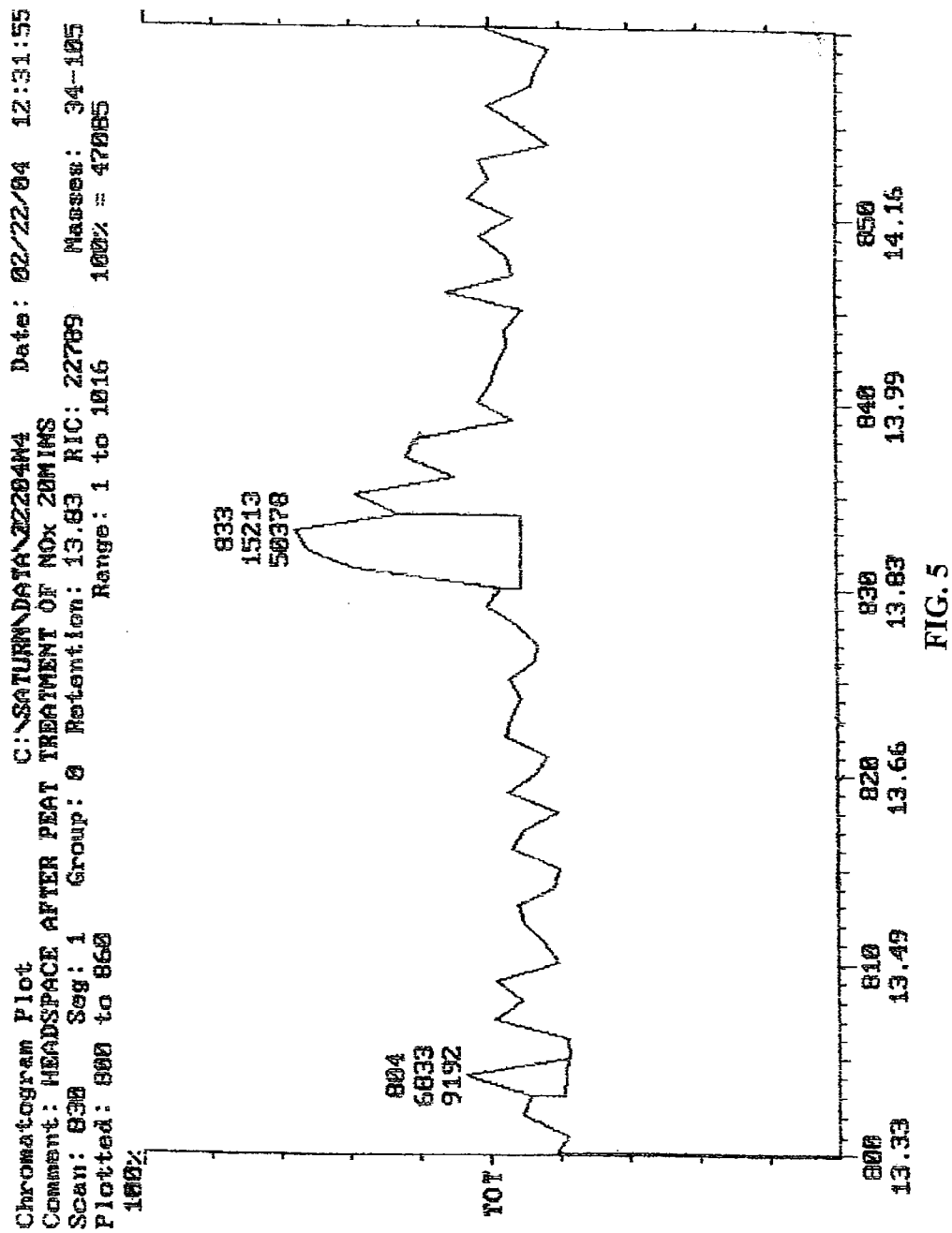
FIG. 5 represents a magnified scale of the chromatograph region surrounding. the $N_2O_5$ peak remaining after peat treatment. $N_2O_5$ is the only detectable gas following peat treatment, present at a concentration reduction of 68% as indicated by the reduction in the area under the peak.

The present invention relates to methods for the biosequestration and organic assimilation of one or more environmental contaminants from industrial waste. The present invention provides cost-effective means for capturing and assimilating a noxious gas or gases and/or particulate matter from industrial waste, thereby reducing the level of pollutants released into the atmosphere.

In one aspect, the present invention relates to a method for the biosequestration and organic assimilation of a gas that contributes to the greenhouse effect. This method comprises introducing a gas that contributes to the greenhouse effect into a peat bog where it is thereafter sequestered and organically assimilated. In the methods of the present invention, a peat bog may be any peat bog irrespective of geographic location, and may be either an ombrotropic or minerotropic bog. The peat bog may be any size and may exist in a natural or cultured environment. It is a requirement of the present invention that the peat bog comprise a system for effective biosequestration of the introduced gas. In a preferred embodiment, the peat bog comprises a cap, or surface comprising layers of sphagnum-sedge collectively reaching a depth of about one-half meter.

A greenhouse gas of the present invention may be any gas which is known to contribute to the greenhouse effect. The term "greenhouse effect" herein is intended to encompass the environmental effects of global warming and/or acid rain. The greenhouse gas may comprise methane ($CH_4$), or any carbon oxide ($CO_x$) or nitrogen oxide ($NO_x$) gas. A carbon oxide of the present invention may comprise carbon monoxide (CO) or carbon dioxide ($CO_2$). A nitrogen oxide of the present invention may comprise $NO_3^-$, $NO_2^-$, NO, $N_2O$, $N_2O_2$, $N_2O_3$, $N_2O_4$, or $N_2O_5$.

The greenhouse gas may further comprise any carbon-halogen or sulfur-halogen containing gas. A carbon-halogen containing gas may comprise methyl bromide ($CH_3Br$) or carbon tetrachloride ($CCl_4$). A carbon-halogen containing gas may further comprise a gas selected from hydrofluorocarbons (HFCs), chlorofluorocarbons (CFCs), and/or perfluorocarbons (PFCs). Specific examples of perfluorocarbons (PFCs) include $CF_4$ and $C_2F_6$. A sulfur-halogen containing gas may comprise sulfurhexofluoride ($SF_6$).

Wherein the greenhouse effect is acid rain, a gas for biosequestration and organic assimilation by the methods of the present invention may further comprise sulfur oxide ($SO_x$) gases and/or volatile organic compounds (VOCs). A sulfur oxide gas may comprise sulfur dioxide ($SO_2$), sulfur trioxide ($SO_3$) and sulfate ($SO_4^{-2}$). Non-limiting examples of volatile organic compounds of the present invention include non-methane hydrocarbons, alcohols, aldehydes and organic acids.

A method for the biosequestration and organic assimilation of a gas that contributes to the greenhouse effect may further comprise capturing the greenhouse gas. Capture disallows the escape of fugitive greenhouse gases into the atmosphere. Furthermore, capture enables transport of a captured gas generated at a distance from a peat bog. Capture of the gas may be achieved using any of a number of capture means which are known in the art. The capture means may be characterized by the ability to absorb, associate, crack, chelate, strip, dissociate, dissolve, entrap, modify, precipitate, or purify the greenhouse gas. The capture means may comprise a water or alkaline solution. Non-limiting examples of capture technologies used in the art are described in U.S. Pat. Nos 6,592,829; 3,961,019; 4,036,593; 4,081,509; 5,032,252; 5,160,426; 6,579,507; and 6,579,508; the entire contents of which are herein incorporated by reference.

Greenhouse gases are most commonly adsorbed with a chemical reaction using amine or alkanolamine solutions. These reactions are considered to be the most cost effective and have the best proven operability records. Non-limiting examples of alkanolamine solutions which are known in the art include monoethanolamine (MEA), diethanolamine (DEA), triethanolamine, methyldiethanolamine (MDEA), and 2-amino-2-methyl-1-propanolamine (AMP). Methods employing a combination of amine solutions, and/or alkanolamine/aqueous solution blends fall within the scope of the present invention. Examples of alkanolamine/aqueous solution blends, which are known in the art, include H2O/MEA, H2O/DEA, H2O/MDEA, H2O/AMP, AMP/MDEA/H2O, AMP/DEA/H2O, DEA/MDEA/H2O, MDEA/MEA/H2O, and AMP/MEA/H2O. While it is not a requirement that any specific capture solution be utilized in conjunction with the methods of the present invention, a capture solvent that has a high greenhouse gas absorption capacity as well as low vapor pressure, high degradation resistance, and low corrosivity is preferred.

A number of efficient proprietary solvents for capture have been developed and any may be used in the context of the present invention. The essential elements of solvent selection criterion are feed gas characteristics (composition, pressure, temperature, etc.) and the captured gas specifications (i.e. the process requirements). The working capacity of the capture solvent establishes its circulation rate at the capture site. The solvent circulation rate has a direct impact on the size of the absorber tower, piping system, circulation pumps and the size of the required facilities. The partial pressure of the greenhouse gas considered in the feed gas to a first approximation determines the solvent circulation rate. A countercurrent column provides contact of the feed gas with fully loaded rich solvent. At a minimum there must be therefore sufficient solvent to absorb all of the desired greenhouse gas in the feed and provide a driving force for absorption at the contact site.

Partial pressure of the greenhouse gas in the product determines the degree of regeneration required. The equilibrium partial pressure of a greenhouse gas in the solvent must be lower than the partial pressure of the product gas. The pressure differential provides a driving force for absorption at the top of the absorber. Therefore, two most important cost factors—circulation rate and regeneration energy duty—are established to a significant extent by the greenhouse gas partial pressures in the feed and the product. In addition, a significant portion of the investment of a chemically reactive system is dependent on the regeneration energy duty.

Once captured, the greenhouse gas may then be transported to a processing facility located at or near a peat bog. Capture allows transport in bulk via cargo, rail or truck, as deemed appropriate. Once transported, the gas may then be regenerated in a closed system and thereafter introduced into the peat bog where it is sequestered and organically assimilated. The introduced greenhouse gas is physically captured in the recesses of the peat, especially if the peat lands are undisturbed and the cap has not been removed. Means for regeneration may vary, and depend on the specific capture means employed. In a preferred embodiment, a gas which is captured via absorption with a chemical process using an amine solution is regenerated via thermal desorption. The extent of heat required to break down the gas amine complex during the regeneration stage depends partly on the heat of reaction. Solvents with lower heat reaction require less energy for regeneration than those that have higher heats of reaction. Solvent working capacities of different solvents including proprietary solvents are well documented. (*Solubility of nitrous oxide in amine solutions*; Z. Bensetiti, I. Iliuta, F. Larachi, B. P. A. Grandjean, Department of Chemical Engineering & CERPIC, Laval University, Sainte Foy (Quebec) Canada G1k & p4, Industrial & Engineering Chemistry Research 38, 328–332 (1999); the Second International Conference on Carbon Dioxide Removal in Japan; and the Fourth International Conference on Greenhouse Gas Control Technologies in Switzerland).

Once regenerated, the gases are pumped into the recesses of the peat bog where the gases are first chemically bound to the organic matter before assimilation by resident microbes. In a preferred embodiment, the gas is introduced into the peat bog via processes such as unidirectional injection in gaseous or liquid phase into the recesses of peat. Assimilation of the gas results in the incorporation of the gas into the elemental organic matter that constitutes peat. Once the chemical reaction between greenhouse gases and peat occurs, microorganisms play a dominant role in the rapid decomposition and mineralization of the organic matter. The microorganisms predominantly responsible for the organic assimilation comprise fungi, bacteria, and/or actinomycetes. The greenhouse gases add to the peat's organic compounds and the elements of carbon, nitrogen, oxygen, and sulfur. The addition or reduction in the levels of microorganisms may be regulated to increase or decrease further assimilation. The acidity levels may be buffered to accommodate further assimilation into the peat. Once the greenhouse gases are reclaimed, the capture solution may be recycled for further capture and regeneration cycles.

A simple example of this process can be illustrated by the production of electricity. In the combustion cycle the targeted flue gas $NO_x$ is bubbled as it leaves the combustion chamber through an amine solution. Aqueous amine solutions of monoethanolamine (MEA), diethanolamine (DEA), for example, can absorb about 45% moles of $NO_x$ per mole of amine solution. The amine solution may then be transported to a facility adjacent to a peat reserve. The amine solvents are reclaimed via thermal desorption of the greenhouse gases in a closed loop system. The $NO_x$ gases may be injected into the peat recesses utilizing a unidirectional grid system of underground pipes. The amine solution minus the $NO_x$ emissions may be returned to the bubbler at the electric utility to repeat the cycle again.

Organic assimilation of greenhouse gases within the recesses of the peat is achieved via known chemical reactions which occur in the peat. A few representative reactions are shown below. Carbon, nitrogen and sulfur have similar cycles as they react with the atmosphere and soil. Plants are constantly taking carbon dioxide from air and replacing it with oxygen. Plants combine this $CO_2$ with water to yield starch and oxygen. An equation for this carbon cycle is:

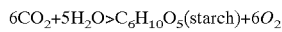
$6CO_2 + 5H_2O > C_6H_{10}O_5(starch) + 6O_2$ $CO_2$ further undergoes other reactions with microbes in peat to biologically produce CO (carbon monoxide) and ultimately to acetate and or methane. Sulfur trioxide ($SO_3$) similarly goes to sulfur dioxide ($SO_2$) and then ultimately to hydrogen sulfide, and then upon incomplete combustion, to sulfur and oxygen. $SO_4^{2-} > SO_3 > SO_2 > H_2S > S$. These carbon, nitrogen and sulfur cycles may operate concurrently and mimic each other.

Nitrification is the process by which $NH_4^+$ is oxidized to $NO_2^-$ and subsequently to $NO_3^-$. One class of nitrifiers, the autotrophic nitrifiers, uses the energy yield from $NH_4^+$ oxidation to fix carbon used in growth and maintenance, analogous to the way plants use solar energy to fix carbon via photosynthesis. A second class of nitrifiers, the heterotrophic nitrifiers, gain their energy from breakdown of organic matter. Autotrophic nitrifiers include two groups, one that converts ammonium to nitrite, for example Nitrosolobus and other "Nitroso-" genera, and another that converts nitrite to nitrate, for example *Nitrobacter* and other "Nitro-" genera. These autotrophic nitrifiers are obligate aerobes that synthesize structural and metabolic carbon compounds by reducing $CO_2$ using energy from $NH_4^+$ or $NO_2^-$ oxidation to drive $CO_2$ fixation. Although autotrophic nitrification predominates in many ecosystems, heterotrophic nitrification can be important in ecosystems with low nitrogen availability or acidic soils. Many heterotrophic fungi and bacteria, including actinomycetes, produce $NO_2^-$ or $NO_3^-$ from $NH_4^+$. Some also use organic nitrogen in the process. Finally, nitric oxide (NO) and nitrous oxide ($N_2O$) are produced during nitrification ("Chapter 8. Terrestrial Nutrient Cycling." Principles of Terrestrial Ecosystem Ecology Chapin III, F. Stuart, Matson, Pamela, Mooney, Harold A. 1st ed. 2002 Corr. 2nd printing, 2004, XIV, 436 p. 199 illus.).

($NH_4^+ + 1.5 O_2 = NO_2^- + H_2O + 2H^+$) ("Nitrification." Henriksen, K, and Kemp, W. M. 1988. Nitrification in Estuarine and Coastal Marine Sediments, pp. 207–249 in T. H. Blackburn and J. Sorensen (eds.), Nitrification in Estuarine and Coastal Marine Sediments. Nitrogen Cycling in Coastal Marine Environments, John Wiley and Sons Ltd. Berounsky, V. M. and Nixon, S. W. 1990. Temperature and the annual cycle of nitrification in waters of Narragansett Bay. Limnology and Oceanography 35, 1610–1617).

"The term denitrification (or complete denitrification) should designate the complete reduction of nitrates to atmospheric nitrogen and oxides of nitrogen, while the other processes involving disappearance of nitrates may be referred to as nitrate reduction and nitrate assimilation" (Waksman, Selman A. *Principles of Soil Microbiology*. Baltimore: The Williams & Wilkins Company, 1932). "Denitrifying microbes are a diverse group: numerous genera are known to contain denitrifying species, including *Pseudomonas, Paracoccus, Flavobacterium, Thiobacillus, Hyphomicrobium, Azospirillum, Alcaligenes, Nitrosomonas* and *Achromobacter*. Species from these genera occupy a variety of ecological niches and are composed of autotrophs, heterotrophs, organotrophs and lithotrophs" (Apel, William A., Turick, Charles E. "The use of denitrifying bacteria for the removal of nitrogen oxides from combustion gases." *Fuel*, Vol. 72, Issue 12, pg. 1715–1718, 1993). The denitrification process has been thought to be an obligatorily anaerobic respiratory process with $NO_x$ serving as a catabolic terminal electron acceptor. Denitrification can also occur under aerobic conditions (Apel, William A., Turick, Charles E. "The use of denitrifying bacteria for the removal of nitrogen oxides from combustion gases." *Fuel*, Vol. 72, Issue 12, pg. 1715–1718, 1993). In anaerobic denitrification, vegetation (decayed organic matter) provides the required carbon for energy. The reaction is thermodynamically favorable and readily occurs when the appropriate bacteria are present to mediate this reaction (Eslick, Jack C. "Bogs: A Web Presentation." ES767 Quaternary Geology 2001. Anderson, W. I., 1998, Iowa's Geological Past: Three Billion Years of Earth History, University of Iowa Press, Iowa City, Iowa. Barnhart, R. K.(Editor), 1988, Chambers Dictionary of Etymology, Chambers Harrap Publishers, Ltd., Edinburgh. Bates, R. L. and Jackson, J. A. (Editors), 1984, Dictionary of Geological Terms, 3rd Ed., Anchor Books, New York, N.Y. Cady, G. H., 1987, in McGraw-Hill Encyclopedia of Science and Technology, Parker, S. P. (Editor), McGraw-Hill Book Company, New York, N.Y. Cecil, C. B, Dulong, F. T., Cobb, J. C., and Supardi, 1993, Allogenic and autogenic controls on sedimentation in the central Sumatra basin as an analogue for Pennsylvanian coal-bearing strata in the Appalachian basin, in; Cobb, J. C., and Cecil, C. B., eds., Modern and Ancient Coal-Forming Environments, Boulder, Colo., Geological Society of American Special Paper 286. Chapelle, F. H., 2001, Ground-Water Microbiology and Geochemistry, 2nd Ed., John Wiley & Sons, Inc., New York, N.Y. Dammon, A. W. H., and French, T. W., 1987, The Ecology of Peat Bogs of the Glaciated Northeastern United States, U.S. Fish and Wildlife Service Biological Report 85(7.16) Supt. of Documents, Washington D.C. Davis, J. H., 1946, The Peat Deposits of Florida: Their Occurrence, Development, and Uses, Geological Bulletin No.30, The Florida Geological Survey, Tallahassee, Fla. Glob, P. V., 1965, The Bog People, Iron-age Man Preserved, Ballantine Books, New York, N.Y. Eastman, J., 1995, The Book of Swamp and Bog Trees, Shrubs, and Wildflowers of Eastern Freshwater Wetlands, Stackpole Books, Mechanicsburg, Penn. Eicher, D. L., 1976, Geologic Time, 2nd Ed., Prentice-Hall, Inc. Englewood Cliffs, N.J. Hansen, H. P., 1941, Paleoecology of Two Peat Deposits on the Oregon Coast, Oregon State University, Corvallis, Oreg. Lowe, J. J. and Walker, M. J. C., 1997, Reconstructing Quaternary Environments, 2nd ed., Addison Wesly Longman Limited, Essex, England. Manahan, S. E., 1991, Environmental Chemistry, 5th Ed., Lewis Publishers, Inc., Chelsea, Mich. Niering, W. A., 1998, Wetlands, Alfred A. Knopf, New York, N.Y. Menon, S., 1997, The People of the Bog, Discover Magazine, Vol. 18 No. 8, p. 60–8. Parker, S. P. (Editor), 1989, Dictionary of Scientific and Technical Terms, 5th Ed., McGraw-Hill Book Company, New York, N.Y. Starr, C. and Taggart, R., 1992, Biology: The Diversity of Life, 5th Ed., Wadsworth Publishing Company, Belmont, Calif.).

Denitrifying reduction of $NO_2^-$ occurs in two enzymatic steps, with NO as an obligatory intermediate. The denitrification pathway describes a sequential pathway involving two enzymes, nitrate reductase and nitric oxide reductase, with NO as a free intermediate ($NO_2^- \rightarrow NO \rightarrow N_2O$). This is known as the indirect pathway. NO once formed rapidly dimerizes to produce $N_2O$, this proposal suggests that the N=N bond of $N_2O$ is formed by a spontaneous nonenzymatic chemical reaction following a 1-electron reduction of NO by NO reductase (Ye, Rick W., Averill, Bruce A., Tiedje, James M. "Denitrification: Production and Consumption of Nitric Oxide." *Applied and Environmental Microbiology*, Apr. 1994, Vol. 60, No. 4, pg. 1053–1058). Nitrite reduction and nitric oxide reduction are two distinct but related processes. Regulatory genes result in reduction of $NO_2$ and NO. The reduction of NO is energy conserving. One important function of NO is to serve as an electron acceptor and conserve energy.

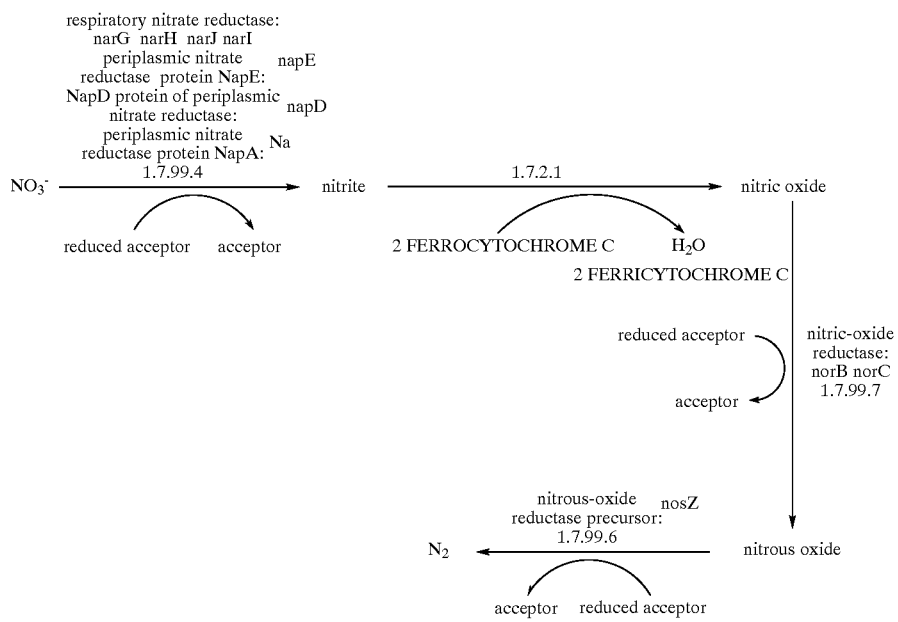

(Source: http://biocyc.org:1555/PSEUDO/new-image?type=PATHWAY&object=DENITRIFICATION-PWY)

The less accepted direct pathway suggests the conversion of $NO_2^-$ to $N_2O$ might be carried out entirely by nitrite reductase via a process in which an enzyme-bound nitrosyl ($NO^+$) formed by dehydration of $NO_2-$ underwent nucleophillic attack by a second nitrite to form enzyme-bound $N_2O_3$. In the direct pathway NO is not an obligatory free intermediate. (Ye, Rick W., Averill, Bruce A., Tiedje, James M. "Denitrification: Production and Consumption of Nitric Oxide." *Applied and Environmental Microbiology*, Apr. 1994, Vol. 60, No. 4, pg. 1053–1058) The direct pathway ($NO_2 \rightarrow N_2O$) can be represented by:

$NO_3^- > NO_2^- > NO^+ + NO_2^- > N_2O_3 > N_2O > N_2$

In the presence of a Nitrite reductase

Enzyme-bound nitrosyl ($NO^+$)

"Most denitrifiers have the enzymatic potential to carry out the entire reductive sequence." The three conditions required for significant denitrification are: low oxygen, high nitrate concentration, and a supply of organic carbon. Oxygen supply is reduced by high soil water content, which impedes the diffusion of oxygen through soil pores ("Chapter 8. Terrestrial Nutrient Cycling." Ecosystem ecology text. Principles of Terrestrial Ecosystem Ecology Chapin III, F. Stuart, Matson, Pamela, Mooney, Harold A. 1st ed. 2002. Corr. 2nd printing, 2004, XIV, 436 p. 199 illus.). Denitrification is primarily an anaerobic process. A simplified, generalized denitrification pathway is:

$(NO_3^- \to NO_2^- \to NO \to N_2O \to N_2)$(Apel, William A., Turick, Charles E. "The use of denitrifying bacteria for the removal of nitrogen oxides from combustion gases."

Fuel, Vol. 72, Issue 12, pg. 1715–1718, 1993)
The end product of denitrification is gaseous Nitrogen $N_2$.
Where:
$NO_3^-$ means nitrate
$NO_2^-$ means nitrite
NO means nitric oxide
$N_2$ O means nitrous oxide, and
$N_2$ means dinitrogen or gaseous nitrogen.

The most important variable that may affect nitrification/denitrification processes within the recesses of the peat is water level. An ombrogenous bog is approximately 98% water. An ombrogenous bog generally receives its water mainly from precipitation and maintains its water levels by capillary action. The upper 30 cm is the region where aerobic respiration or nitrification occurs. Below that the water saturation point approaches the 98% level. Due to the high water content there are lower oxygen levels. Thus, it is the region where denitrification occurs.

The second most important variable that may affect nitrification/denitrification processes within the recesses of the peat is the availability of organic compounds. The organic compounds in an ombrogenous peat bog have a carbon content of over 50% dissolved materials. This is important, as it is the energy source and the physical space where denitrification occurs. Nitrification utilizes (receives its energy from) ammonium and oxygen to allow the microbes to form nitrites which are then used in the denitrification cycle to ultimately produce gaseous nitrogen.

Optimum temperatures for nitrification range from 10° to 30° centigrade. Nitrification becomes more limited as temperature decreases, however although denitrification may be slightly effected by lower temperatures, it will nevertheless continue at a substantial rate. This may be attributed to prevailing denitrificants acting at differing temperatures. For example, maximum rates of $N_2O$ reduction with Psuedomonas denitrificants occurred at 35° C., and Paracoccus Denitrificants at 30° C. (Apel, William A., Turick, Charles E. "The use of denitrifying bacteria for the removal of nitrogen oxides from combustion gases." Fuel, Vol. 72, Issue 12, pg. 1715–1718, 1993).

Microbial activity is an important factor in organic assimilation of materials within peat. The numbers of microbes in one gram of soil average 200,000. Under certain conditions, such as the availability of nutrients, the microbe population can reach upwards of 75 million per gram. It must be kept in mind that the microbes can produce enzymes that in turn can produce 20,000 new proteins per second on average. The microbe population lies dormant until subjected to an increase in nutrient source (such as man made $NO_x$ emissions). These microbe populations can literally bloom while competing with each other. This is important to the denitrification process.

Another important variable relating to the nitrogen flux capacity is the vegetative cap. The rate of fugitive emissions into the atmosphere is reduced by 50% if the vegetative cap is undisturbed (Ikkonen, E. N., Kurets, V. K., Grabovik, S. I., Drozdov, S. N. "The Rate of Carbon Dioxide Emission into the Atmosphere from a Southern Darelian Mesooligotrophi Bog." Russina Journal of Ecology, Vol. 32, No. 6, 2001, pp 382–385). Much of nitrogen fixation occurs in the upper 30 cm of the ombrogenous peat bog, especially in the nodes of the root structure. Nitrification occurs in a large aerobic and a tiny anaerobic zone in the upper layers of a bog. Denitrification occurs in tiny spatial areas mainly in the lower layers of the bog. The composition of peat offers a huge surface area where the periplasmic reductase proteins allow for acceptor reduction of nitrate into gaseous nitrogen. The spatial requirements or microsites for denitrification are very small and are distributed throughout all the recesses of the peat. The denitrification process approaches 100% production of gaseous nitrogen, which is then transported to the atmosphere by diffusion (Waksman, Selman A. *Principles of Soil Microbiology*. Baltimore: The Williams & Wilkins Company, 1932).

Methanogenesis, the biological production of methane from $CO_2$, takes place under anoxic conditions and can be viewed as a type of anaerobic respiration. Synthesis of ATP is linked to a chemiosmotic mechanism involving an electrochemical $H^+$ potential intermediate. The phosphorylation of ADP is coupled with the reduction of the coenzyme M-coenzyme B heterodisulfide. The Net Reaction Equation is as follows:

$$4H_2+CO_2=CH_4+2H_2O$$

The microbial species data is available for: *Archaebacteria, Methanobacterium thermoautotrophicum, Methanobrevibacter, Methanothermus, Methanococcus, Methanomicrobium, Methanogenium, Methanospirillum, Methanoplanus, Methanoculleus, Methanopyrus, Methanocorpusculum, Methanobacterium, Methanosarcina, Methanosarcina barkeri*, and *Methanosarcina thermophila*.

The pathway for methanogenesis from $CO_2$ can be represented as follows (Mathews95: Mathews CK, van Holde KE Biochemistry, Second Edition The Benjamin/Cummings Publishing Company Menlo Park, Calif. 1995. Overbeek98: Overbeek, R, Larsen, N, Selkov, EE, Maltsev, M "The WIT Database." 1998 WWW URL http://www.cme.msu.edu/WIT/. Thauer98: Thauer RK (1998). "Biochemistry of methanogenesis: a tribute to Marjory Stephenson. 1998 Marjory Stephenson Prize Lecture." Microbiology 1998;144 (Pt 9);2377–406. PMID: 9782487):

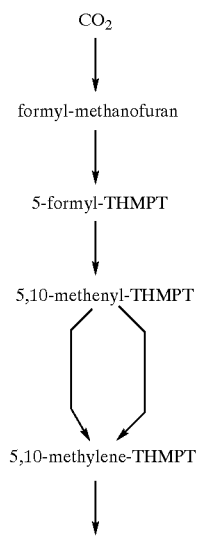

-continued

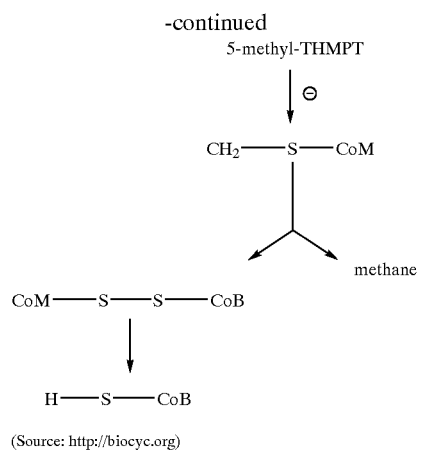

(Source: http://biocyc.org)

The carbon monoxide dehydrogenase (an enzyme that catalyzes the removal of hydrogen from a substrate and the transfer of the hydrogen to an acceptor in an oxidation-reduction reaction) pathway is as follows: (2001–2002 SRI International SRI International Pathway Tools software, page generated on Thu May 13, 2004. The resulting data set was derived computationally using Pathologic; a software module included with Pathway Tools for creating a pathway/genome database from an annotated genome. PseudoCyc is hosted by the Brinkman Lab, (Simon Fraser University, Greater Vancouver, BC, Canada) and is continually being updated by the Pseudomonas Community Annotation Project (PseudoCAP)):

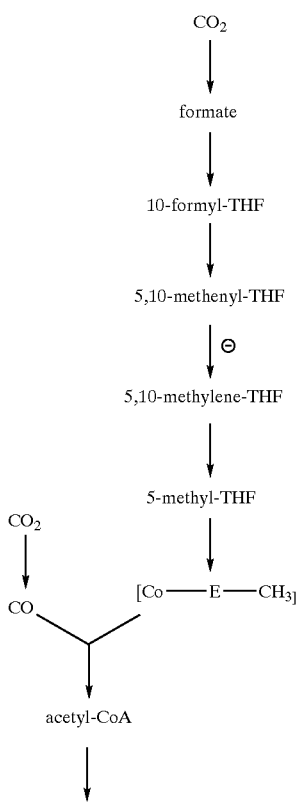

-continued

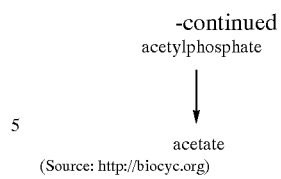

(Source: http://biocyc.org)

Homoacetogenic bacteria are strict anaerobes that can synthesize acetate from $H_2$ and $O_2$. Species Data is Available for: *Clostridium thermoaceticum*. Biosynthesis of methane from acetate is as follows:

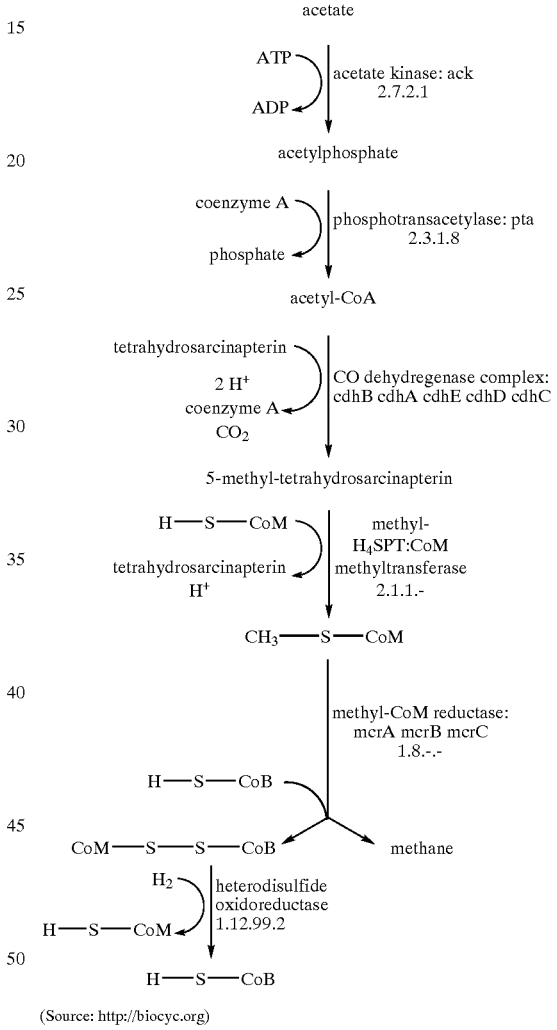

(Source: http://biocyc.org)

Although most of the methane in nature originates from acetate, only two genera of methanogenic acetotrophs are known: the *Methanosarcina* and the *Methanothrix*. The acetate must be activated to acetyl-CoA prior to the cleavage of the C—C and C—S bonds. The carbonyl group is oxidized to $CO_2$, the methyl group is transferred via tetrahydrosarcinapterin to coenzyme M. The methyl-coenzyme M is reductively demethylated to methane with electrons from coenzyme M and coenzyme B. The resulting heterodisulfide of coenzyme M and coenzyme B is then reduced to their sulfhydryl forms. The conversion of acetate to $CH_4$ and $CO_2$ is fermentation.

Net Reaction Equation is: acetate+$H^+$=methane+$CO_2$

Species Data is Available for: *Methanosarcina thermophila* (Ferry92: Ferry J G (1992). "Methane from acetate." J Bacteriol 1992;174(17);5489–95. PMID: 1512186 Ferry97: Ferry J G (1997). "Enzymology of the fermentation of acetate to methane by *Methanosarcina thermophila*." Biofactors 1997;6(1);25–35. PMID: 9233537 James93: James G. Ferry, editor Methanogenesis Ecology, Physiology, Biochemistry & Genetics Chapman & Hall, New York 1993. Thauer98: Thauer R K (1998). "Biochemistry of methanogenesis: a tribute to Marjory Stephenson. 1998 Marjory Stephenson Prize Lecture." Microbiology 1998;144 (Pt 9);2377–406. PMID: 9782487)

Sulfur oxides pathways are assimilated in peat as follows:

The microbe Pseudomonas aeruginosa pathway is represented as (Copyright 2001–2002 SRI International SRI International Pathway Tools software, page generated on Thu May 13, 2004. The resulting data set was derived computationally using Pathologic; a software module included with Pathway Tools for creating a pathway/genome database from an annotated genome. PseudoCyc is hosted by the Brinkman Lab, (Simon Fraser University, Greater Vancouver, BC, Canada) and is continually being updated by the Pseudomonas Community Annotation Project (PseudoCAP)):

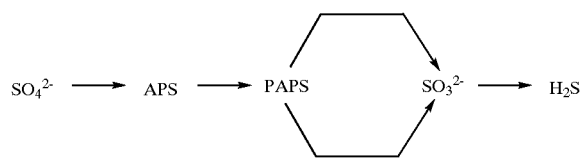

(Source: http://biocyc.org)

The sulfide can be oxidized to sulfur anaerobically by bacteria that include Thiocapsa, Desulfovibrio, Theobacillius and Chromatium. This can be shown as (Bothe: Bothe H., editor, Trebst A., editor "Biology of Inorganic Nitrogen and Sulfur. Springer-Verlag, Berlin Heidelberg 1981."):

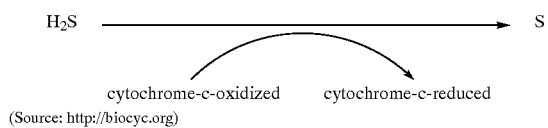

(Source: http://biocyc.org)

Further Sulfur Oxides are oxidized and reduced by various bacteria. Examples are as follows: *Thiobacillus tepidarius* can utilize a wide range of polythionates for growth. *T. tepidarius* oxidizes trithionate to thiosulfate, which is then oxidized to sulfate by a path that may include sulfite as an intermediate, the reaction has not been thoroughly characterized (Friedrich98: Friedrich CG (1998). "Physiology and genetics of sulfur-oxidizing bacteria." Adv Microb Physiol 1998;39;235–89. PMID: 9328649. Kelly93: Kelly D P, Lu W-P, Poole R K "Cytochromes in Thiobacillus tepidarius and the respiratory chain involved in the oxidation of thiosulphate and tetrathionate." Archives of Microbiology 160:87–95 (1993). Kelly97: Kelly D P, Shergill J K, Lu W P, Wood A P (1997). "Oxidative metabolism of inorganic sulfur compounds by bacteria." Antonie Van Leeuwenhoek 1997;71(1–2);95–107. PMID: 9049021. Lu88: Lu W-P, Kelly D P "Kinetic and energetic aspects of inorganic sulphur compound oxidation by *Thiobacillus tepidarius*." Journal of General Microbiology 134:865–876 (1988). Lu88a: Lu W-P, Kelly D P "Cellular location and partial purification of the 'thiosulphate-oxidizing enzyme' and 'trithionate hydrolyase' from *Thiobacillus tepidarius*." Journal of General Microbiology 134:877–885 (1988)).

Represented as:

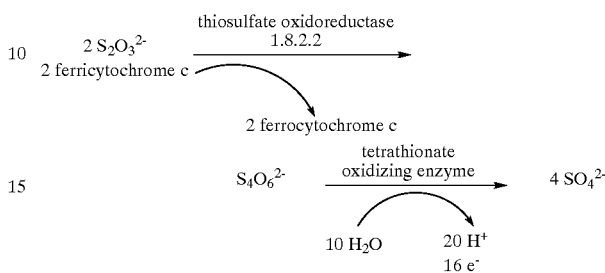

(Source: http://biocyc.org)

The bacteria *Desulfovibrio* reduces bisulfite via trithionate and thiosulfate yielding sulfur and sulfite (Lee73: Lee J P, LeGall J, Peck H D (1973). "Isolation of assimilatory- and dissimilatory-type sulfite reductases from *Desulfovibrio vulgaris*." J Bacteriol 1973;115(2);529–42. PMID: 4725615).

Represented as:

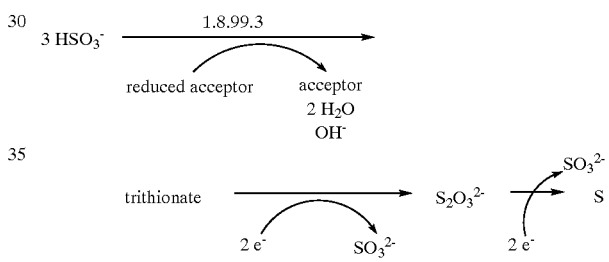

(Source: http://biocyc.org)

Dissimilatory sulfate reduction uses the bacteria *Dessulfovibrio*. Sulfate-reducers are able to use sulfate as a terminal electron acceptor. Sulfate is activated to adenosinephosphosulfate (APS). APS is reduced to sulfite which is in turn reduced to hydrogen sulfide, which is excreted (Gottschalk86: Gottschalk, G "Bacterial Metabolism, Second Edition." Springer-Verlag, N.Y. 1986. Hansen94: Hansen T A (1994). "Metabolism of sulfate-reducing prokaryotes." Antonie Van Leeuwenhoek 1994;66(1–3); 165–85. PMID: 7747930).

Represented as:

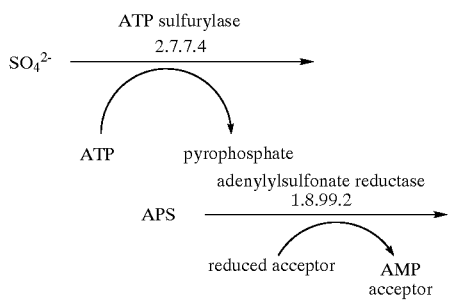

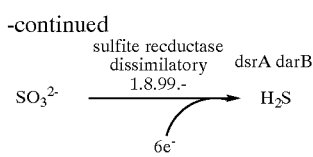

(Source: http://biocyc.org)

Volatile organic compounds (VOCs) can be degraded and assimilated in peat aerobically and anaerobically. VOCs are relatively insignificant as direct greenhouse gases. VOCs produce organic aerosols in the atmosphere, like ozone, which themselves are direct greenhouse gases (www.ghgonline.org/othervocs.htm., Dave Reay, GreenHouse Gas Online.org© 2002 and 2003). Some VOCs can combine with nitrogen oxides to form ozone. The monocyclic aromatic hydrocarbons, benzene, toluene, ethylbenzene, and the xylene isomers (o-, m-, and p-), collectively know as BTEX, are some of the most water-soluble volatile organic compounds. Aromatic compounds such as BTEX are important growth substrates for microorganisms. Initially, it was believed that these compounds could only be degraded under aerobic conditions, i.e. in the presence of molecular oxygen. Particular microorganisms can anaerobically degrade such aromatic compounds. Toluene-degrading bacteria isolated thus far range phylogenetically from nitrate-reducing bacteria clustering in the Azoarcus/Thauera branch of the β-subclass of proteobacteria, to two sulfate-reducing bacteria (*Desulfobacula toluolica* and strain PRTOL1 and one ferric iron reducing bacteria (*Geobacter metallireducens* belonging to the δ-subclass of proteobacteria to one toluene-utilizing phototrophic bacterium (*Blastochloris sulfoviridis*) belonging to the α-subclass of proteobacteria (Anders95: Anders H J, Kaetzke A, Kampfer P, Ludwig W, Fuchs G (1995). "Taxonomic position of aromatic-degrading denitrifying pseudomonad strains K 172 and KB 740 and their description as new members of the genera *Thauera*, as *Thauera aromatica* sp. nov., and *Azoarcus*, as *Azoarcus evansii* sp. nov., respectively, members of the beta subclass of the Proteobacteria." Int J Syst Bacteriol 1995;45(2); 327–33. PMID: 7537067. Beller96: Beller H R, Spormann A M, Sharma P K, Cole J R, Reinhard M (1996). "Isolation and characterization of a novel toluene-degrading, sulfate-reducing bacterium." Appl Environ Microbiol 1996;62(4); 1188–96. PMID: 8919780. Beller97: Beller H R, Spormann A M (1997). "Anaerobic activation of toluene and o-xylene by addition to fumarate in denitrifying strain T." J Bacteriol 1997;179(3);670–6. PMID: 9006019. Beller97a: Beller, H R, Spormann, A M "Benzylsuccinate formation as a means of anaerobic toluene activation by sulfate-reducing strain PRTOL1." Appl Environ Microbiol (1997) 63, 3729–2731. Biegert96: Biegert T, Fuchs G, Heider J (1996). "Evidence that anaerobic oxidation of toluene in the denitrifying bacterium Thauera aromatica is initiated by formation of benzylsuccinate from toluene and fumarate." Eur J Biochem 1996;238(3);661–8. PMID: 8706665. Coschigano97: Coschigano P W, Young L Y (1997). "Identification and sequence analysis of two regulatory genes involved in anaerobic toluene metabolism by strain T1." Appl Environ Microbiol 1997;63(2);652–60. PMID: 9023943. Harwood99: Harwood, C. S., Burchhardt, G., Herrmann, H, Fuchs, G. "Anaerobic metabolism of aromatic compounds via the benzoyl-CoA pathway." FEMS Microbiol Rev (1999) 22, 439–458. Heider97: Heider J, Fuchs G (1997). "Anaerobic metabolism of aromatic compounds." Eur J Biochem 1997;243(3);577–96. PMID: 9057820. Heider99: Heider, J, Spormann, A M, Beller, H R, Widdel, F "Anaerobic bacterial metabolism of hydrocarbons." FEMS Microbiol Rev (1999) 22: 459–473. Leuthner00: Leuthner B, Heider J (2000). "Anaerobic toluene catabolism of Thauera aromatica: the bbs operon codes for enzymes of beta oxidation of the intermediate benzylsuccinate." J Bacteriol 2000;182(2);272–7. PMID: 10629170. Lovley93: Lovley D R, Giovannoni S J, White D C, Champine J E, Phillips E J, Gorby Y A, Goodwin S (1993). "Geobacter metallireducens gen. nov. sp. nov., a microorganism capable of coupling the complete oxidation of organic compounds to the reduction of iron and other metals." Arch Microbiol 1993;159(4); 336–44. PMID: 8387263. Rabus93: Rabus R, Nordhaus R, Ludwig W, Widdel F (1993). "Complete oxidation of toluene under strictly anoxic conditions by a new sulfate-reducing bacterium." Appl Environ Microbiol 1993;59(5); 1444-51. PMID: 7686000. Rabus95: Rabus R, Widdel F (1995). "Anaerobic degradation of ethylbenzene and other aromatic hydrocarbons by new denitrifying bacteria." Arch Microbiol 1995;163(2);96–103. PMID: 7710331. Rabus98: Rabus, R, Heider, J "Initial reactions of anaerobic metabolism of alkylbenzenes in denitrifying and sulfate-reducing bacteria." Arch Microbiol (1998) 170, 377–384. Smith90: Smith M R (1990). "The biodegradation of aromatic hydrocarbons by bacteria." Biodegradation 1990;1(2–3);191–206. PMID: 1368147. Zengler99: Zengler K, Heider J, Rossello-Mora R, Widdel F (1999). "Phototrophic utilization of toluene under anoxic conditions by a new strain of blastochloris sulfoviridis." Arch Microbiol 1999;172(4);204-12. PMID: 0010525736. Zhou95: Zhou J, Fries M R, Chee-Sanford J C, Tiedje J M (1995). "Phylogenetic analyses of a new group of denitrifiers capable of anaerobic growth of toluene and description of *Azoarcus tolulyticus* sp. nov." Int J Syst Bacteriol 1995;45(3);500-6. PMID: 8590677).

Represented as:

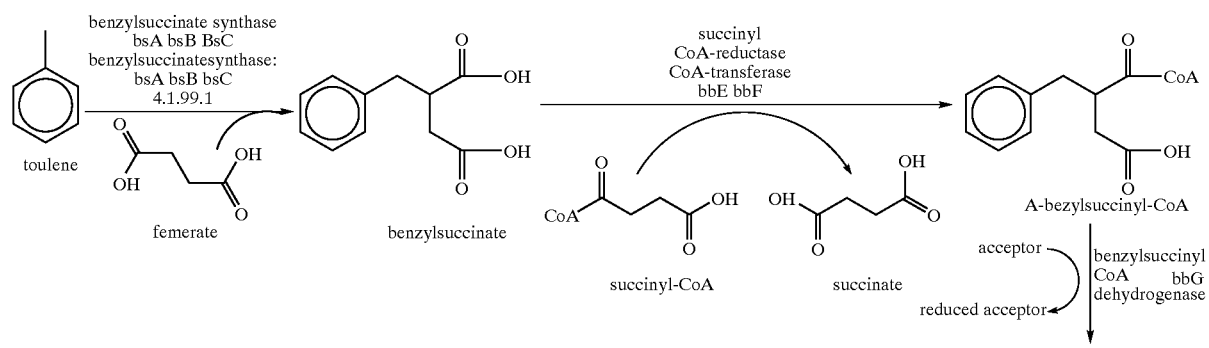

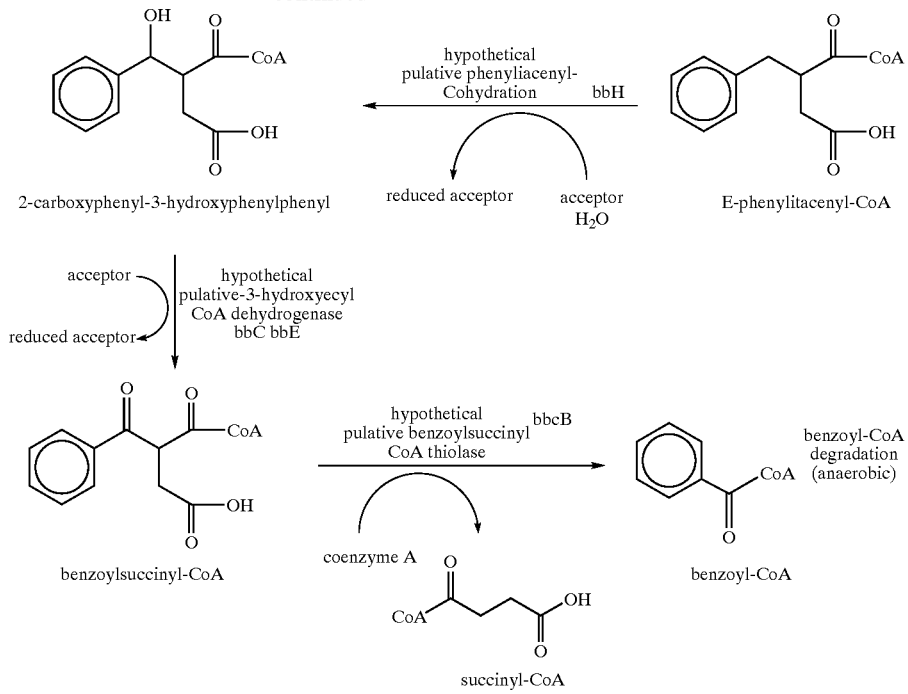

(Source: http://biocyc.org)

Toluene degradation via Pseudomonas mendocina involves a sequence of ortho ring cleavage, represented as (Bossert89: Bossert I D, Whited G, Gibson D T, Young L Y (1989). "Anaerobic oxidation of p-cresol mediated by a partially purified methylhydroxylase from a denitrifying bacterium, " J Bacteriol 1989;171(6);2956–62. PMID: 2722739. McIntire86: McIntire W, Singer T P, Smith A J, Mathews F S (1986). "Amino acid and sequence analysis of the cytochrome and flavoprotein subunits of p-cresol methylhydroxylase." Biochemistry 1986;25(20);5975–81. PMID: 3790500. Whited91: Whited G M, Gibson D T (1991). "Separation and partial characterization of the enzymes of the toluene-4-monooxygenase catabolic pathway in Pseudomonas mendocina KR1." J Bacteriol 173(9); 3017-20. PMID: 2019564. Yen91: Yen K M, Karl M R, Blatt L M, Simon M J, Winter R B, Fausset P R, Lu H S, Harcourt A A, Chan K K (1991). "Cloning and characterization of a Pseudomonas mendocina KR1 gene cluster encoding toluene-4-monooxygenase." J Bacteriol 1991;173(17); 5315–27. PMID: 1885512):

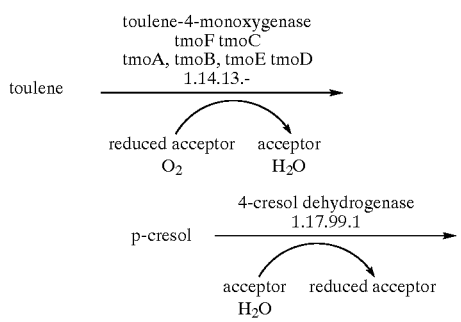

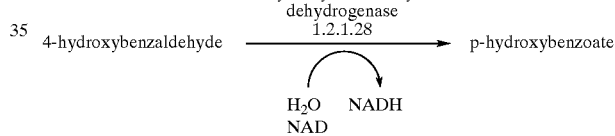

(Source: http://biocyc.org)

Anaerobic degradation by ring cleavage of benzoyl-CoA by Rhodopseudomonas palustris (Breese98: Breese K, Boll M, Alt-Morbe J, Schagger H, Fuchs G (1998). "Genes coding for the benzoyl-CoA pathway of anaerobic aromatic metabolism in the bacterium Thauera aromatica." Eur J Biochem 1998;256(1);148–54. PMID: 9746358. Egland97: Egland P G, Pelletier D A, Dispensa M, Gibson J, Harwood C S (1997). "A cluster of bacterial genes for anaerobic benzene ring biodegradation." Proc Natl Acad Sci U S A 1997;94 (12);6484–9. PMID: 9177244. Hartel93: Hartel U, Eckel E, Koch J, Fuchs G, Linder D, Buckel W (1993). "Purification of glutaryl-CoA dehydrogenase from Pseudomonas sp., an enzyme involved in the anaerobic degradation of benzoate." Arch Microbiol 1993;159(2);174–81. PMID: 8439237. Harwood99a: Harwood C S, Burchhardt G, Herrmann H, Fuchs G "Anaerobic metabolism of aromatic compounds via the benzoyl-CoA pathway." FEMS Microbiology Reviews 22:439–458 (1999). Heider98: Heider J, Boll M, Breese K, Breinig S, Ebenau-Jehle C, Feil U, Gad'on N, Laempe D, Leuthner B, Mohamed M E, Schneider S, Burchhardt G, Fuchs G (1998). "Differential induction of enzymes involved in anaerobic metabolism of aromatic compounds in the denitrifying bacterium Thauera aromatica." Arch Microbiol 1998;170(2);120–31. PMID: 9683649. Laempe99: Laempe D, Jahn M, Fuchs G (1999). "6-Hydroxycyclohex-1-ene-1-carbonyl-CoA dehydrogenase and 6-oxocyclohex- 1-ene-1-carbonyl-CoA hydrolase, enzymes of the benzoyl-CoA pathway of anaerobic aromatic metabolism in the denitrifying bacterium *Thauera aromatica.*" Eur J Biochem 1999;263(2);420–9. PMID: 10406950. Pelletier00: Pelletier D A, Harwood C S (2000). "2-Hydroxycyclohexanecarboxyl coenzyme A dehydrogenase, an enzyme characteristic of the anaerobic benzoate degradation pathway used by Rhodopseudomonas palustris." J Bacteriol 2000;182(10);2753–60. PMID: 10781543. Pelletier98: Pelletier D A, Harwood C S (1998). "2-Ketocyclohexanecarboxyl coenzyme A hydrolase, the ring cleavage enzyme required for anaerobic benzoate degradation by Rhodopseudomonas palustris." J Bacteriol 1998;180(9);2330–6. PMID: 9573182), represented as:

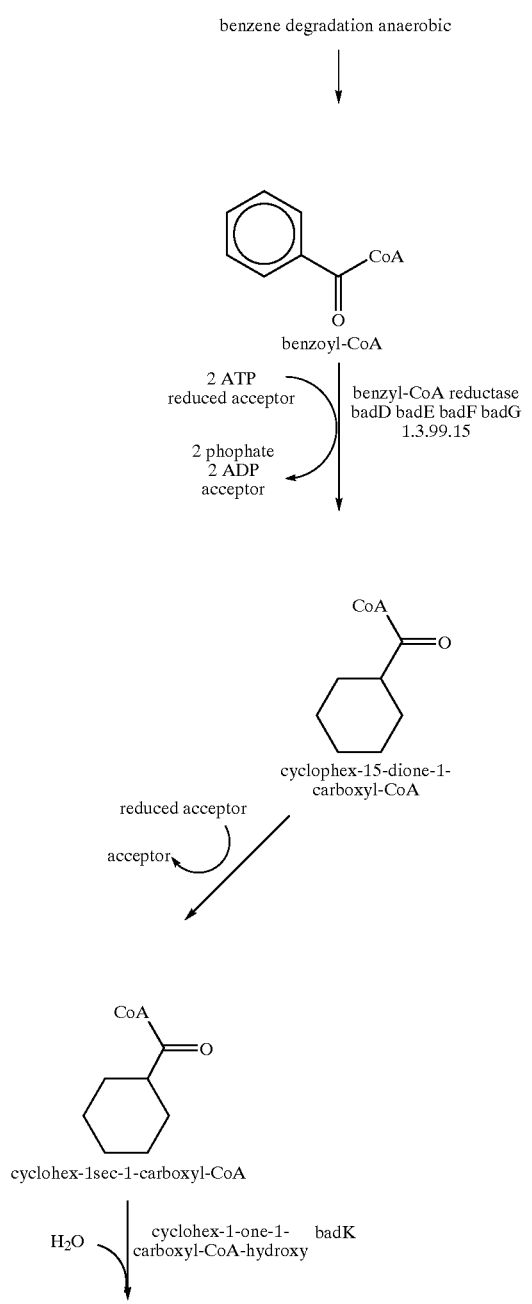

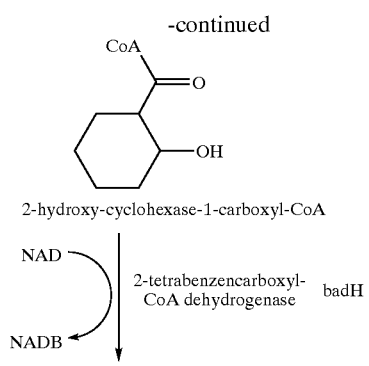

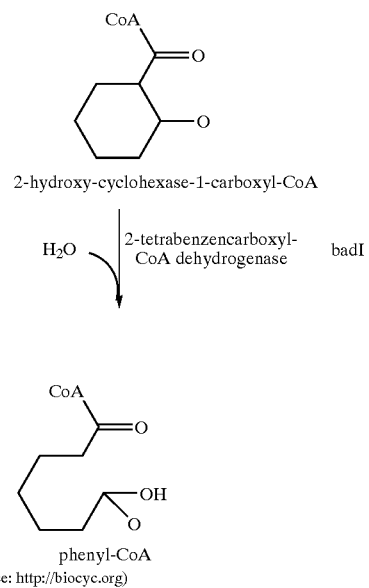

(Source: http://biocyc.org)

Anaerobic oxidation of ethylbenzene a water-soluble constituent of gasoline in the presence of the bacteria Azoarcus in the b-subclass proteobacteria (EBN1, EB1) can be represented as (Ball96: Ball H A, Johnson H A, Reinhard M, Spormann A M (1996). "Initial reactions in anaerobic ethylbenzene oxidation by a denitrifying bacterium, strain EB1." J Bacteriol 1996;178(19);5755–61. PMID: 8824622. Breese98: Breese K, Boll M, Alt-Morbe J, Schagger H, Fuchs G (1 998). "Genes coding for the benzoyl-CoA pathway of anaerobic aromatic metabolism in the bacterium *Thauera aromatica.*" Eur J Biochem 1998;256(1);148–54. PMID: 9746358. Champion99: Champion K M, Zengler K, Rabus R (1999). "Anaerobic degradation of ethylbenzene and toluene in denitrifying strain EbN1 proceeds via independent substrate-induced pathways." J Mol Microbiol Biotechnol 1999;1(1);157–64. PMID: 10941798. Hartel93: Hartel U, Eckel E, Koch J, Fuchs G, Linder D, Buckel W (1993). "Purification of glutaryl-CoA dehydrogenase from *Pseudomonas* sp., an enzyme involved in the anaerobic degradation of benzoate." Arch Microbiol 1993;159(2); 174–81. PMID: 8439237. Harwood99a: Harwood CS, Burchhardt G, Herrmann H, Fuchs G "Anaerobic metabolism of aromatic compounds via the benzoyl-CoA pathway." FEMS Microbiology Reviews 22:439–458 (1999). Heider98: Heider J, Boll M, Breese K, Breinig S, Ebenau-Jehle C, Feil U, Gad'on N, Laempe D, Leuthner B, Mohamed M E, Schneider S, Burchhardt G, Fuchs G (1998).

"Differential induction of enzymes involved in anaerobic metabolism of aromatic compounds in the denitrifying bacterium *Thauera aromatica*." Arch Microbiol 1998;170(2); 120–31. PMID: 9683649. Johnson01: Johnson H A, Pelletier D A, Spormann A M (2001). "Isolation and characterization of anaerobic ethylbenzene dehydrogenase, a novel Mo-Fe-S enzyme." J Bacteriol 2001;183(15);4536–42. PMID: 11443088. Johnson99: Johnson H A, Spormann A M (1999). "In vitro studies on the initial reactions of anaerobic ethyl- (1998) 170, 377–384. Sluis96: Sluis M K, Small F J, Allen J R, Ensign S A (1996). "Involvement of an ATP-dependent carboxylase in a CO2-dependent pathway of acetone metabolism by Xanthobacter strain Py2." J Bacteriol 1996;178(14);4020–6. PMID: 8763926. Sluis97: Sluis M K, Ensign S A (1997). "Purification and characterization of acetone carboxylase from Xanthobacter strain Py2." Proc Natl Acad Sci U S A 1997;94(16);8456–61. PMID: 9237998):

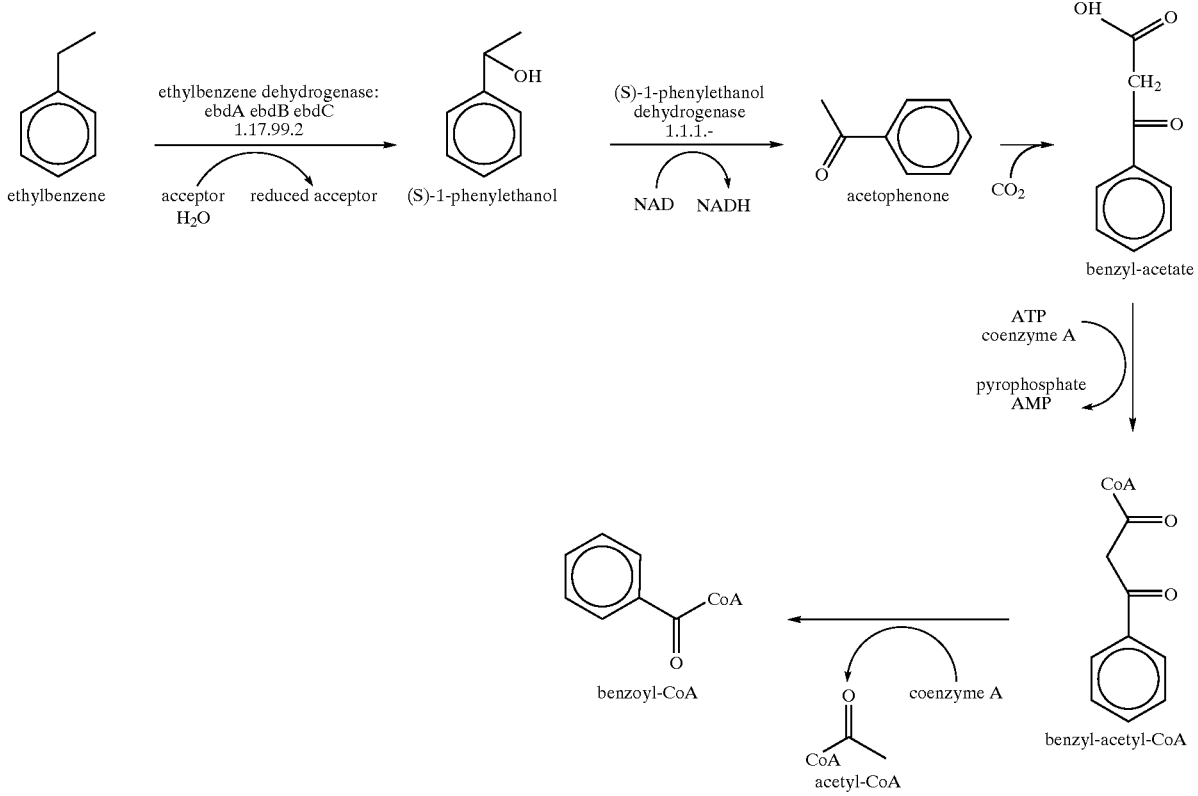

(Source: http://biocyc.org)

benzene mineralization." J Bacteriol 1999;181(18);5662–8. PMID: 10482506. Kniemeyer01: Kniemeyer O, Heider J (2001). "(S)-1-phenylethanol dehydrogenase of Azoarcus sp. strain EbN1, an enzyme of anaerobic ethylbenzene catabolism." Arch Microbiol 2001;176(1–2);129–35. PMID: 11479712. Laempe99: Laempe D, Jahn M, Fuchs G (1999). "6-Hydroxycyclohex-1-ene-1-carbonyl-CoA dehydrogenase and 6-oxocyclohex-1-ene-1-carbonyl-CoA hydrolase, enzymes of the benzoyl-CoA pathway of anaerobic aromatic metabolism in the denitrifying bacterium *Thauera aromatica*." Eur J Biochem 1999;263(2);420–9. PMID: 10406950. Platen89: Platen H, Schink B (1989). "Anaerobic degradation of acetone and higher ketones via carboxylation by newly isolated denitrifying bacteria." J Gen Microbiol 1989;135 (Pt 4);883–91. PMID: 2557377. Rabus95: Rabus R, Widdel F (1995). "Anaerobic degradation of ethylbenzene and other aromatic hydrocarbons by new denitrifying bacteria." Arch Microbiol 1995;163(2);96–103. PMID: 7710331. Rabus98: Rabus, R, Heider, J "Initial reactions of anaerobic metabolism of alkylbenzenes in denitrifying and sulfate-reducing bacteria." Arch Microbiol Carbon-halogen compounds, which include hydrofluorocarbons (HFCs), Perfluorocarbons (PFCs) and sulfurhexofluoride ($SF_6$) are assimilated in peat by microbial activity. Carbon and one or more of the following halogens, fluorine (F), chlorine (Cl), bromine (Br), iodine (I) and astanine (At) can be exemplified as follows:

Methyl bromide ($CH_3Br$), a widely used agricultural fumigant, may be an important source of atmospheric bromine radicals, which destroy stratospheric ozone. Bacterial mediation of methyl bromide is rapid and irreversibly removed to below levels found in the global atmosphere (Nature 377, 717–719 (2002); doi:10.1038/377717a0 Rapid degradation of atmospheric methyl bromide in soils, J. H. Shorter, C. E. Kolb, P. M. Crill, R. A. Kerwin, R. W. Talbot, M. E. Hines & R. C. Harriss).

Bromochloromethane ($BrCH_2Cl$) in the presence of hydrolases of Pseudomonas fluorescens is reduced to $Br^{-1}$+ $Cl^{-1}$+ Formaldehyde ($CH_2=O$) by acting on halide bonds (SRI International 1999–2004, Marine Biological Laboratory 1998–2001, DoubleTwist Inc 1998–1999. Nucleic Acids Res. 30(1):56 2002).

Carbon tetrachloride ($CCl_4$) or (CT) is a toxic compound used as a cleaning solvent, fumigant and in the intermediate in the production of refrigerants. Highly chlorinated compounds, such as carbon tetrachloride, are degraded more easily in anaerobic conditions than under aerobic conditions. The first step in the degradation of CT, often a dechlorination, can be performed by specific halorespiring bacteria, but acetogenic and methanogenic bacteria are also able to transform chlorinated compounds by aspecific reactions. *Acetobacterium woodii* is able to degrade carbon tetrachloride by reductive and substitutive mechanisms. No enzymes are involved in these pathways. Rather, metallocoenzymes such as corrinoids, cytochrome P450, and iron (II) porphyrins are known to play a key role in the biotransformation of CT. *Acetobacterium* utilizes the acetyl coenzyme A (CoA) pathway and high levels of corrinoids to degrade CT to mainly chloroform, dichloromethane, and several soluble nonchlorinated products. In contrast, in *Shewanella alga*BrY, an organism lacking the acetyl-CoA pathway, CT is primarily converted to carbon monoxide (Egli88: Egli C, Tschan T, Scholtz R, Cook A M, Leisinger T (1988). "Transformation of tetrachloromethane to dichloromethane and carbon dioxide by *Acetobacterium woodii*." Appl Environ Microbiol 1988;54(11);2819–24. PMID: 3145712. Egli90: Egli, C, Strohmeyer, S, Cook, A M, Leisinger, T. "Transformation of tetra- and trichloromethane to $CO_2$ by anaerobic bacteria is a non-enzymatic process." FEMS Microbiology Letters 68:207–212 (1990). Hashsham99: Hashsham S A, Freedman D L (1999). "Enhanced biotransformation of carbon tetrachloride by *Acetobacterium woodii* upon addition of hydroxocobalamin and fructose." Appl Environ Microbiol 1999;65(10);4537–42. PMID: 10508086. Van98: Van Eekert M H A, Schroder T J, Stams A J M, Schraa G, Field J A (1998). "Degradation and Fate of Carbon Tetrachloride in Unadapted Methanogenic Granular Sludge." Appl Environ Microbiol 1998;64(7); 2350–6. PMID: 9647798).

Represented as:

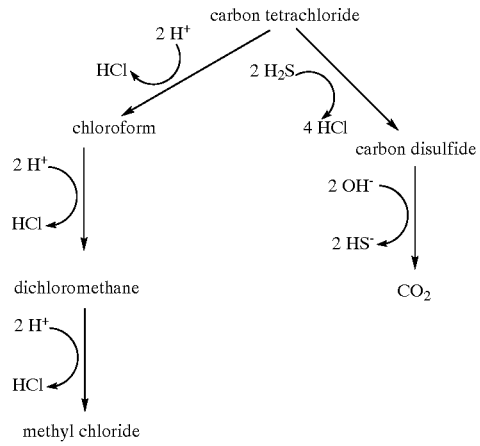

(Source: http://biocyc.org)

Haloalkanes, haloalcohols, haloalkenes and some haloaromatic compound can be microbially assimilated in peat by a multitude of microbes such as Xanthobacter autotrophicus, Arthrobacter J. Bacteriol and Corynebacterium to mention a few.

A generalized equation for this is:
$H_2O$+Haloalkane>R—OH+Halide (SRI International 1999–2004, Marine Biological Laboratory 1998–2001, DoubleTwist Inc 1998–1999 Nucleic Acids Res. 30(1):56 2002; Keuning, S., Janssen, D. B. and Witholt, B. Purification and characterization of hydrolytic haloalkane dehalogenase from Xanthobacter autotrophicus GJ10. J. Bacteriol. 163 (1985) 635–639. [Medline U I: 85261076]. Scholtz, R., Leisinger, T., Suter, F. and Cook, A. M. Characterization of 1-chlorohexane halidohydrolase, a dehalogenase of wide substrate range from an *Arthrobacter* sp. J. Bacteriol. 169 (1987) 5016–5021. [Medline UI: 88032819]. Yokota, T., Omori, T. and Kodama, T. Purification and properties of haloalkane dehalogenase from *Corynebacterium* sp. strain m15–3. J. Bacteriol. 169 (1987) 4049–4054. [Medline UI: 87307981).

In an alternative embodiment, the present invention relates to a method for the biosequestration and organic assimilation of a metal produced as an environmental contaminant from industrial waste. This method comprises introducing the metal into a peat bog where it is thereafter sequestered and organically assimilated. A metal in the context of the present invention may comprise any alkali metal, light metal, and/or heavy transition metal. Examples of alkali metals include lithium, sodium, potassium, rubidium, cesium, and francium. Examples of light metals include beryllium, magnesium, calcium, strontium, barium and radium. Non-limiting examples of heavy transition metals include chromium, mercury, and lead.

Over centuries, peat bogs have soaked up metals that industry releases into the atmosphere, combining them with the organic materials in peat. Metals are assimilated in peat. Examples are microbial action on copper sulfate, acetates of lead and oxidation of galena. A good example of this is galena. Galena is the most abundant of the lead minerals which can be found in a variety of environments. Galena is most commonly found in lead sulfide veins, and scattered in igneous and sedimentary rocks. It is often found associated with silver minerals, and is often present in lead and silver mines. *Thiobacillus plumbophilus* oxidizes galena for growth. It can also oxidize $H_2S$ and $H_2$ (Drobner92: Drobner E, Huber H, Rachel R, Stetter K O (1992). "*Thiobacillus plumbophilus* spec. nov., a novel galena and hydrogen oxidizer." Arch Microbiol 1992;157(3);213–7. PMID: 1510552).

Represented as:

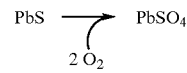

(Source: http://biocyc.org)

Deposition of atmospheric mercury in peat may have doubled since the beginning of the nineteenth century (Nature 355, 434–437 (1992); doi:10.1038/355434a0 Increase in global atmospheric concentrations of mercury inferred from measurements over the Atlantic Ocean, F. Slemr & E. Langer).

Some species of *Pseudomonas* fluoresens are able to degrade phenylmercury acetate. The toxic $Hg^{2+}$ ion is converted to $Hg^0$ which is less toxic and volatile (Mirgain: Mirgain I, Werneburg B, Harf C, Monteil H "Phenylmercuric acetate biodegradation by environmental strains of *Pseudomonas* species." Res Microbiol NIL;140(9); 695–707. PMID: 2626597).

Represented as:

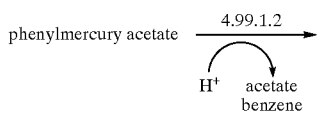

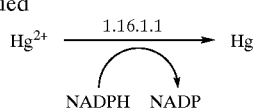

(Source: http://biocyc.org)

Organomecurial compounds can be assimilated in peat by microbes such as Serratia marcescens(SRI International 1999–2004, Marine Biological Laboratory 1998–2001, DoubleTwist Inc 1998–1999. Nucleic Acids Res. 30(1):56 2002).

Represented as:

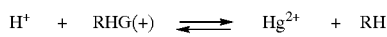

(Source: http://biocyc.org)

Metal assimilation in peat is in part due to the occurrence of magnetic bacteria in peat (Nature 343, 161–163 (1990); doi:10.1038/343161a0, Occurrence of magnetic bacteria in soil, Jörg W. E. Fassbinder, Helge Stanjekt & Hojatollah Vali). This plays an important role in enhancing, retarding, deposition or remobilization of metallic elements or compounds in peat.

In yet another alternative embodiment, the present invention relates to a method for the biosequestration and organic assimilation of particulate matter produced as environmental contaminants from industrial waste. This method comprises introducing the particulate matter into a peat bog where it is thereafter sequestered and organically assimilated. Particulate matter in the context of the present invention may comprise any particulate matter produced as a by-product of industrial production. Examples of particulate matter include soot, dust, dirt, and aerosols. Aerosols are used as a variety of products in the automobile, cosmetics, food, paints and varnishes as well as propellants. Some common propellants are $CO_2$ and NOx. As explained above, microbes in peat can reduce and assimilate these aerosols.

EXEMPLIFICATION

Example I. Organic Assimilation of NOx Gases in Peat

A mixture of nitrogen oxides was generated in the laboratory and passed through a column of peat. Air samples were taken in the generating system and post treatment, which were subsequently analyzed by gas chromatography/mass spectrometry to measure the effectiveness of the treatment system. The system was designed to take advantage of the peat biota's well-documented abilities in the nitrification/denitrification cycle.

A 1 L Erlenmeyer side-armed vacuum flask was fitted with a rubber stopper. A chromatography column was placed through the stopper to allow a means of introducing the reagents without opening the system. Attached to the vacuum port was a short length of Tygon tubing. This tubing connected the 1 L flask to a similar 500 mL flask. The purpose of this flask was to provide a liquid trap to prevent backflow of liquid from the peat to the reaction flask and a safety zone should the NOx generation reaction overwhelm the treatment system. Attached by another short length of latex tubing to this second flask was a glass tube with a diameter of 1.5 inches. Into this glass tube was place 2 inches of wet peat with a mass of 18 grams (wet but with excessive moisture squeezed from it ~=65% solids). 5 grams of copper were placed in the 1-L flask, the chromatography tube was filled with 12.3 mL of 70% nitric acid. The stopcock on the chromatography tube was opened allowing the nitric acid to come in contact with the copper. The reaction produced large amounts of toxic brown fumes. Different NOx gases were produced depending upon the relative concentration of the copper to the acid. By gradually feeding the acid to the copper this ratio changed assuring the production of the various forms of NOx thus mimicking the normal combustion processes.

The reactions are as follows:

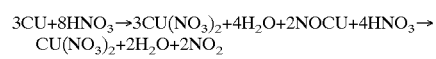

And when a surplus of nitric acid is present $N_2O_5$ and $N_2O_3$ are produced. In the presence of water:

$NO_2$ dimerizes to form dinitrogen tetroxide, $N_2O_4$. At room temperature equilibrium between the two molecules exists. And above room temperature $N_2O_5$ is unstable and decomposes to $N_2O_4$ and $O_2$.

A milliliter of this NOx gas mixture was taken in a gas tight syringe and injected into a Varian 3400 gas chromatograph interfaced to a Varian Saturn II Ion Trap Mass spectrometer. The chromatographic separations were performed on a 0.32 mm ID Restek Plot-Q column and the mass spectrometer was operated in the electron impact mode at 70ev scanning from 33–86 daltons. The chromatogram of this gas sample clearly contains five (5) peaks attributed to the NOx species with the following retention times and masses:

| Peak ID | Retention Time | Scan Number | Peak Area |
|---|---|---|---|
| 1. $N_2O_2$ | 7.77 | 459 | 145,550 |
| 2. $N_2O_3$ | 11.64 | 698 | 277,463 |
| 3. $NO_2$ | 11.83 | 711 | 321,495 |
| 4. $N_2O_4$ | 12.70 | 763 | 205,362 |
| 5. $N_2O_5$ | 13.72 | 827 | 156,954 |

A milliliter of gas was taken from directly above the peat after the gas had passed through the column for 20 minutes (to eliminate the possibility that any of that sample would be entrapped air). The gas was actively passing through the 2-inch plug of wet peat while the sample was taken. This sample was injected into the same analytical system. The chromatogram of this analysis showed only 1 peak attributed to the $NO_x$ species. This is $N_2O_5$ at the Retention Time of 13.82 minutes and an area of 50,378 counts.

The experiment shows that a mixture of NOx gases are removed in the space of time it takes for gas to pass through a 2 inch section of naturally packed peat. Four of the five gases were removed 100% in this experiment and the fifth gas exhibited a concentration reduction of 68%.

What is claimed is:

1. A method for the biosequestration and organic assimilation of a gas that contributes to the greenhouse effect, the method comprising injecting a gas that contributes to the greenhouse effect into the recesses of a peat bog where it is thereafter questered and organically assimilated.

2. The ethod of claim 1 further comprising:
   a) capturing the greenhouse gas using a capture means which enables transport of the captured gas and regeneration of the gas;

b) transporting the captur gas to a processing facility located at or near the peat bog; and c) regenerating the gas prior to its injection into the peat bog.

3. The method of claim 1 wherein the gas is selected from the group consisting of greenhouse gases (GHGs), sulfur oxide ($SO_x$) gases, and volatile organic compounds (VOCs).

4. The method of claim 1 wherein the greenhouse gas is selected from the group consisting of:
a) methane (OH4);
b) carbon oxides;
c) nitrogen oxides ($NO_x$);
d) carbon-halogen containin gases; and
e) sulfur-halogen containing gases.

5. The method o claim 4 wherein the carbon oxides are selected from the group consisting of carbon monoxide (CO) and carbon dioxide ($CO_2$).

6. The method of claim 4 wherein the nitrogen oxides are selected from the group consisting of $NO_3^-$, $NO_2^-$, NO, $N_2O$, $N_2O_2$, $N_2O_3$, $N_2O_4$, and $N_2O_5$.

7. The method of claim 4 wherein the carbon-halogen containing gases are selected from the group consisting of hydrofluorocarbons (HFCs), chlorofluorocarbons (CFs), and perfluorocarbons (PFCs).

8. The method of claim 7 wherein the perfluorocarbons (PFCs) are selected from the group consisting of $CF_4$ and $C_2F_6$.

9. The method of claim 4 wherein the carbon-halogen containing gases are selected from the group consisting of methyl bromide ($CH_3Br$) and carbon tetrachloride ($CCl_4$).

10. The method of claim 4 wherein the sulfur-halogen containing gases comprise sulfurhexofluoride ($SF_6$).

11. The method of claim 3 wherein the sulfur oxides are selected from the group consisting of sulfur dioxide ($SO_2$), sulfur trioxide ($SO_3$), and sulfate ($SO_4^{-2}$).

12. The method of claim 3 wherein the volatile organic compounds are selected from the group consisting of non-methane hydrocarbons, alcohols, aldehydes and organic acids.

13. The method of claim 2 wherein the capture means is characterized by the ability to absorb, associate, crack, chelate, strip, dissociate, dissolve, entrap, modify, precipitate, or purify the greenhouse gas.

14. The method of claim 2 wherein the capture means comprises a water solution.

15. The method of claim 2 wherein the capture means comprises an alkaline solution.

16. The method of claim 2 wherein the capture means comprises an amine solution.

17. The method of claim 16 wherein the amine solution comprises an alkanolamine.

18. The method of claim 17 wherein the alkanolamine is selected from the group consisting of monoethanolamine (MEA), diethanolamine (DEA), triethanolamine, methyldiethanolamine (MDEA), and 2-amino-2-methyl-1-propanolamine (AMP).

19. The method of claim 2 wherein the gas is regenerated via processes such as thermal desorption of the capture solution.

* * * * *

UNITED STATES PATENT AND TRADEMARK OFFICE
CERTIFICATE OF CORRECTION

PATENT NO. : 6,945,925 B2 Page 1 of 1
DATED : September 20, 2005
INVENTOR(S) : Joel Pooler and Christopher L. Pooler It is certified that error appears in the above-identified patent and that said Letters Patent is hereby corrected as shown below:

<u>Column 26,</u>
Line 63, substitute "questered" with -- sequestered --.
Line 64, substitute "ethod" with -- method --.

<u>Column 27,</u>
Line 1, substitute "captur" with -- capture --.
Line 8, substitute "claim 1" with -- claim 3 --.
Line 10, substitute "OH4" with -- CH4 --.
Line 14, substitute "containin" with -- containing --.
Line 16, substitute "o" with -- of --.
Line 24, substitute "(CFs)" with -- (CFCs) --.

Signed and Sealed this

Twenty-second Day of November, 2005

JON W. DUDAS
*Director of the United States Patent and Trademark Office*